US009916356B2

(12) United States Patent
Firsov et al.

(10) Patent No.: US 9,916,356 B2
(45) Date of Patent: Mar. 13, 2018

(54) METHODS AND SYSTEMS FOR INSERT OPTIMIZATION OF TIERED DATA STRUCTURES

(71) Applicant: SanDisk Enterprise IP LLC, Milpitas, CA (US)

(72) Inventors: Evgeny H. Firsov, Palo Alto, CA (US); Harihara Kadayam, Fremont, CA (US); Brian W. O'Krafka, Austin, TX (US); Johann George, Sunnyvale, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 414 days.

(21) Appl. No.: 14/597,181

(22) Filed: Jan. 14, 2015

(65) Prior Publication Data

US 2015/0281389 A1 Oct. 1, 2015

Related U.S. Application Data

(60) Provisional application No. 61/973,221, filed on Mar. 31, 2014.

(51) Int. Cl.
  *G06F 15/167* (2006.01)
  *G06F 17/30* (2006.01)
(52) U.S. Cl.
  CPC .... *G06F 17/3048* (2013.01); *G06F 17/30589* (2013.01)
(58) Field of Classification Search
  CPC ........................ G06F 17/3048; G06F 17/30589

(Continued)

(56) References Cited

U.S. PATENT DOCUMENTS 9,158,681 B1 10/2015 Samuels et al.
9,170,938 B1 10/2015 Walsh et al.
(Continued)

FOREIGN PATENT DOCUMENTS

WO   WO 2015/047398   4/2015
WO   WO 2015/152830   10/2015

OTHER PUBLICATIONS

International Search Report and Written Opinion dated Jun. 30, 2015, received in International Patent Application No. PCT/US2015/023927, which corresponds to U.S. Appl. No. 14/454,687, 11 pages (Kadayam).

(Continued)

*Primary Examiner* — Sm Rahman
(74) *Attorney, Agent, or Firm* — Morgan, Lewis & Bockius LLP

(57) ABSTRACT

A memory controller receives request(s) to perform a plurality of memory operations on a datastore. The memory controller batches, into a set of leaf node operations, memory operations of the plurality of memory operations that are associated with keys in a range of keys, where a leaf node in a tiered data structure stored in the datastore is assigned the range of keys. The memory controller determines whether a condition is satisfied, and, in accordance with a determination that the condition is satisfied: locates the leaf node in the datastore; stores a copy of the leaf node in a cache; modifies the cached copy of the leaf node according to the set of leaf node operations so as to obtain one or more modified leaf nodes; and writes the one or more modified leaf nodes to one or more locations in the datastore with one or more write operations.

18 Claims, 21 Drawing Sheets

(58) Field of Classification Search
USPC .................................................... 709/214
See application file for complete search history.

(56) References Cited

U.S. PATENT DOCUMENTS

| | | |
|---|---|---|
| 2003/0229627 A1 | 12/2003 | Carlson et al. |
| 2004/0167898 A1 | 8/2004 | Margolus et al. |
| 2006/0159109 A1* | 7/2006 | Lamkin ............ G06F 17/30174 370/401 |
| 2007/0156842 A1 | 7/2007 | Vermeulen et al. |
| 2007/0174309 A1 | 7/2007 | Pettovello |
| 2007/0185902 A1 | 8/2007 | Messinger et al. |
| 2009/0012976 A1 | 1/2009 | Kang et al. |
| 2009/0119450 A1 | 5/2009 | Saeki et al. |
| 2011/0145512 A1 | 6/2011 | Adl-Tabatabai et al. |
| 2011/0252067 A1 | 10/2011 | Marathe et al. |
| 2012/0005419 A1 | 1/2012 | Wu et al. |
| 2012/0117328 A1* | 5/2012 | McKean ............ G06F 12/0866 711/136 |
| 2012/0166360 A1* | 6/2012 | Shah ................ G06Q 30/0283 705/400 |
| 2012/0179645 A1 | 7/2012 | Lomet et al. |
| 2012/0259863 A1 | 10/2012 | Bodwin et al. |
| 2014/0185376 A1 | 7/2014 | Sinclair et al. |
| 2015/0212752 A1 | 7/2015 | Nemazie et al. |
| 2015/0242307 A1 | 8/2015 | Busaba et al. |
| 2015/0253999 A1 | 9/2015 | Nemazie et al. |
| 2015/0277794 A1 | 10/2015 | Tudor et al. |
| 2015/0278093 A1 | 10/2015 | O'Krafka et al. |
| 2015/0370492 A1 | 12/2015 | Satnur et al. |
| 2015/0370701 A1 | 12/2015 | Higgins et al. |
| 2015/0378884 A1 | 12/2015 | Nemazie et al. |

OTHER PUBLICATIONS

Wilson's: "Working Draft SCSI Extended Copy Command," Apr. 2, 1999, http://www.t10.org/ftp/t10/document.99/99-143r1.pdf, 34 pages.

International Search Report and Written Opinion dated Nov. 7, 2016, received in International Patent Application No. PCT/US2016/051717, which corresponds to U.S. Appl. No. 14/929,171, 13 pages (Shelton).

International Search Report and Written Opinion dated Sep. 14, 2016, received in International Patent Application No. PCT/US2016/036720, which corresponds to U.S. Appl. No. 15/144,704, 12 pages (Cheru).

International Search Report and Written Opinion dated Mar. 15, 2017, received in International Patent Application No. PCT/US2016/067728, which corresponds to U.S. Appl. No. 15/208,540, 14 pages (O'Krafka).

* cited by examiner

Tiered Data Structure 630   632   State 612

636

Memory Operations Buffer 210

| Operation Type | Key | Value |
|---|---|---|
| Insert | 12 | ... |
| Insert | 13 | ... |
| Insert | 14 | ... |
| Insert | 15 | ... |
| Insert | 16 | ... |
| Insert | 17 | ... |

604

Tiered Data Structure 730 732

State 712

734-1

736

Memory Operations Buffer 210

| Operation Type | Key | Value |
|---|---|---|
| Insert | 14 | ... |
| Insert | 15 | ... |
| Insert | 18 | ... |
| Insert | 16 | ... |
| Insert | 17 | ... |
| Insert | 19 | ... |
| Insert | 26 | ... |
| Insert | 25 | ... |
| Insert | 20 | ... |
| Insert | 23 | ... |

| Datastore 136-B | | | | | | | |
|---|---|---|---|---|---|---|---|
| Slab 220-1 | Slab 220-2 | Slab 220-3 | Slab 220-4 | Slab 220-5 | Slab 220-6 | Slab 220-7 | |
| Idx No 222-1 | Idx No 222-2 | Idx No 222-3 | Idx No 222-4 | Idx No 222-5 | Idx No 222-6 | Idx No 222-7 | |
| Status: Used 224-1 | Status: Free 224-2 | Status: Used 224-3 | Status: Used 224-4 | Status: Used 224-5 | Status: Used 224-6 | Status: Free 224-7 | |
| Node: 732 226-1 | | Node: 734-1 226-3 | Node No 226-4 | Node: 736 226-5 | Node: xxx 226-6 | | |
| TDS: 730 228-1 | | TDS: 730 228-3 | TDS No 228-4 | TDS: 730 228-5 | TDS: xxx 228-6 | | |
| Data 229-1 | | Data 229-4 | Data 229-4 | Data 229-5 | Data 229-6 | | ... |
| Slab 220-8 | Slab 220-9 | Slab 220-10 | Slab 220-11 | Slab 220-12 | Slab 220-13 | Slab 220-14 | |
| Idx No 222-8 | Idx No 222-9 | Idx No 222-10 | Idx No 222-11 | Idx No 222-12 | Idx No 222-13 | Idx No 222-14 | |
| Status: Used 224-8 | Status: Free 224-9 | Status: Used 224-10 | Status: Used 224-11 | Status: Used 224-12 | Status: Used 224-13 | Status: Used 224-14 | |
| Node: xxx 226-8 | | Node: xxx 226-10 | Node: 734-4 226-11 | Node: 738 226-12 | Node: 740 226-13 | Node: 742 226-14 | |
| TDS: xxx 228-8 | | TDS: xxx 228-10 | TDS: 730 228-11 | TDS: 730 228-12 | TDS: 730 228-13 | TDS: 730 228-14 | |
| Data 229-8 | | Data 229-10 | Data 229-11 | Data 229-12 | Data 229-13 | Data 229-14 | ... |

US 9,916,356 B2

METHODS AND SYSTEMS FOR INSERT OPTIMIZATION OF TIERED DATA STRUCTURES

RELATED APPLICATIONS

This application claims priority to U.S. Provisional Patent Application No. 61/973,221, filed Mar. 31, 2014, which is hereby incorporated by reference in its entirety.

TECHNICAL FIELD

The disclosed embodiments relate generally to memory systems, and in particular, to improving the performance and reliability of tiered data structures.

BACKGROUND

The speed of many computer operations is frequently constrained by the speed and efficiency with which data can be stored and retrieved from data structures associated with a device. Many conventional data structures take a long time to store and retrieve data. However, tiered data structures can be used to dramatically improve the speed and efficiency of data storage. Some tiered data structures enable data searches, data insertions, data deletions, and sequential data access to be performed in logarithmic time. However, further improvements to tiered data structures can further increase the speed, efficiency, and reliability with which data can be stored and retrieved, thereby improving the performance of devices relying on such tiered data structures.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to improving the performance and reliability of tiered data structures.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIGS. 8A-8B illustrate prophetic states of the datastore in response to performance of the third prophetic set of batched insert operations in the data storage system.

Figure 1:
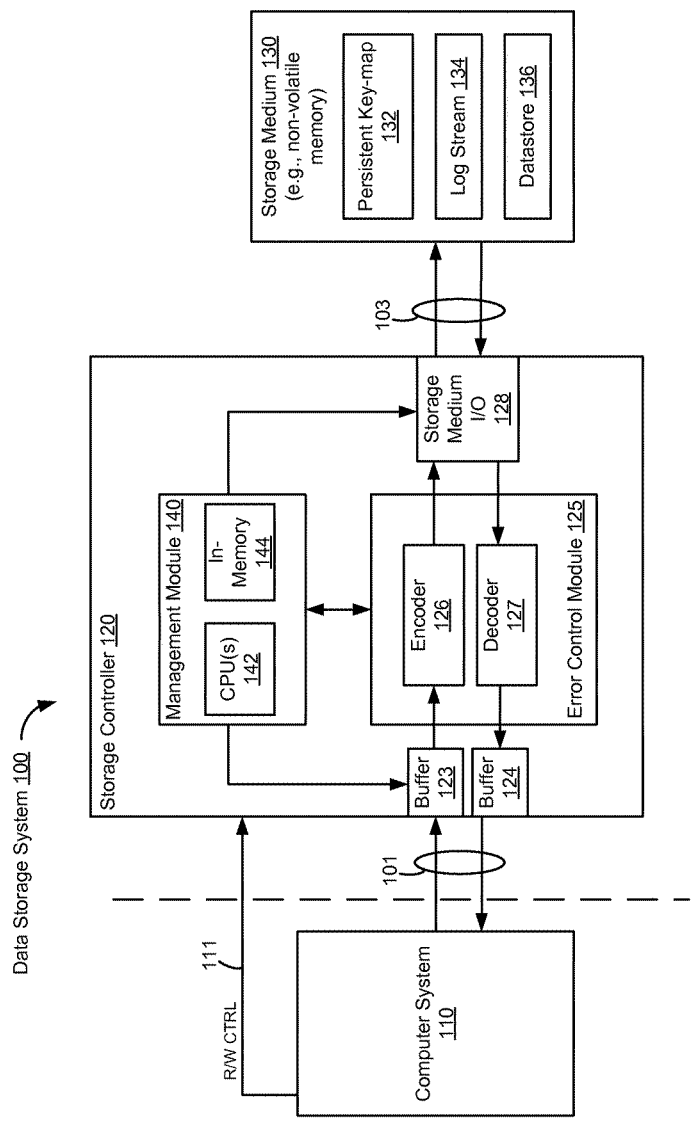
FIG. 1 is a block diagram illustrating an implementation of a data storage system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to improve the performance and reliability of tiered data structures.

Some embodiments include a method of improving the input/output efficient of a data storage system that includes: a memory controller; a non-volatile memory with a datastore comprising one or more tiered data structures; and a volatile memory with a cache and a key-map storing datastore location information for a plurality of keys corresponding to data objects in the one or more tiered data structures stored in the datastore. In some embodiments, the method is performed by the memory controller (e.g., management module 140, FIGS. 1 and 3) with one or more processors (e.g., CPU(s) 142, FIGS. 1 and 3) and memory (e.g., memory 302, FIG. 3). In some embodiments, the memory controller is operatively coupled with or, alternatively, includes the non-volatile memory and the volatile memory. In some embodiments, the non-volatile memory (e.g., storage medium 130, FIGS. 1 and 2B) comprises one or more non-volatile memory devices. In some embodiments, the one or more non-volatile memory devices includes one or more three-dimensional (3D) memory devices and circuitry associated with operation of memory elements in the one or more 3D memory devices. In some embodiments, the circuitry and one or more memory elements in a respective 3D memory device, of the one or more 3D memory devices, are on the same substrate (e.g., a silicon substrate). In some embodiments, the volatile memory comprises one or more volatile memory devices (e.g., in-memory 144, FIGS. 1, 2A, and 3).

Figure 2A:
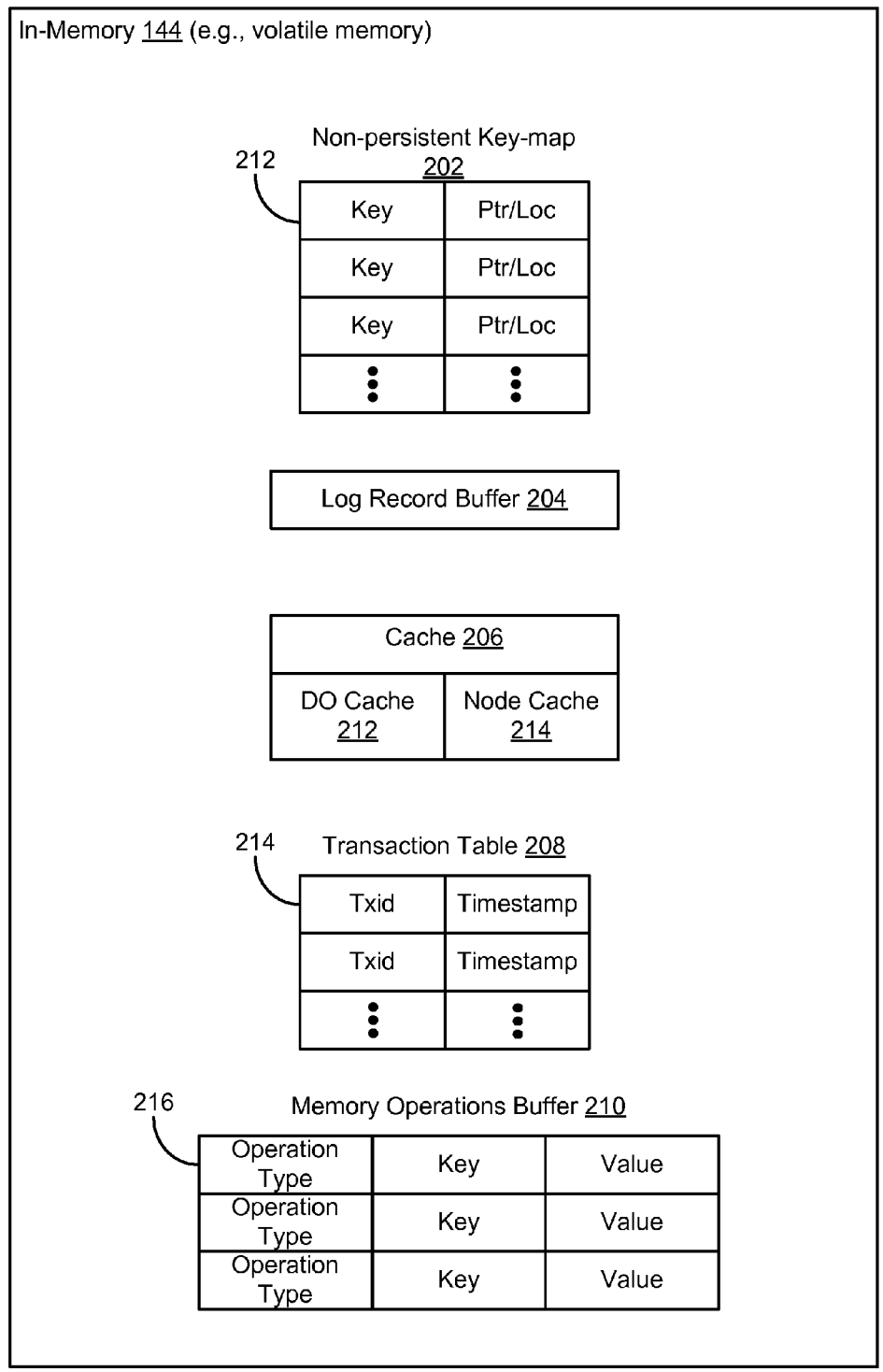
FIG. 2A is a block diagram illustrating data structures associated with a management module in accordance with some embodiments.
Figure 3:
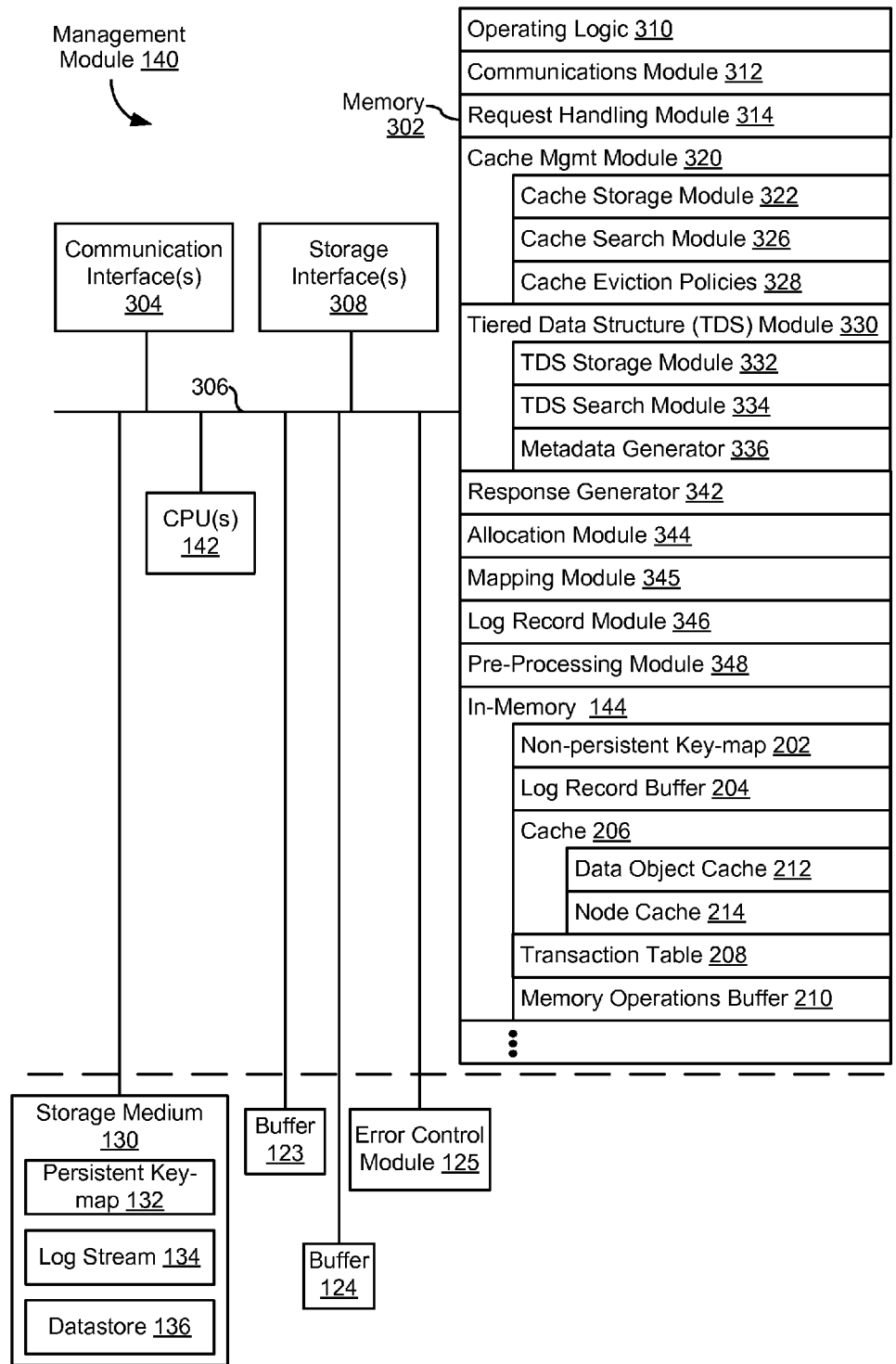
FIG. 3 is a block diagram of a memory management module in accordance with some embodiments.

In some embodiments, the key-map is a non-persistent key-map (e.g., non-persistent key-map 202, FIGS. 2A and 3) that is stored in volatile memory (e.g., in-memory 144, FIGS. 1, 2A, and 3). The method includes receiving one or more requests to perform transactions that include a plurality of memory operations to be performed on the datastore. The method includes batching, into a set of leaf node operations, memory operations of the plurality of memory operations that are associated with keys in a range of keys, where a respective leaf node (sometimes called a first leaf node) in a tiered data structure of the one or more tiered data structures is assigned the range of keys. The method includes determining whether one or more predefined conditions are satisfied. In accordance with a determination that the one or more conditions are satisfied, the method includes: locating the respective leaf node in the tiered data structure using the key-map to map one of the keys associated with one of the memory operations in the set of leaf node operations to a location in the datastore that includes the respective leaf node; storing a copy of the respective leaf node in the cache; modifying the copy of the respective leaf node according to the set of leaf node operations so as to obtain one or more modified leaf nodes; and writing the one or more modified leaf nodes to one or more locations in the datastore with one or more write operations.

Some embodiments include a computer system or device (e.g., data storage system 100, FIG. 1 or management module 140, FIGS. 1 and 3), comprising: one or more processors; and memory storing one or more programs to be executed by the one or more processors, the one or more programs comprising instructions for performing or controlling performance of any of the methods described herein. Some embodiments include a non-transitory computer readable storage medium, storing one or more programs for execution by one or more processors of a computer system or device (e.g., data storage system 100, FIG. 1 or management module 140, FIGS. 1 and 3), the one or more programs including instructions for performing any of the methods described herein. Some embodiments include a computer system or device (e.g., data storage system 100, FIG. 1 or management module 140, FIGS. 1 and 3) comprising: means for performing the operations of any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a diagram of an implementation of a data storage system 100 in accordance with some embodiments. While some example features are illustrated, various other features have not been illustrated for the sake of brevity and so as not to obscure more pertinent aspects of the example embodiments disclosed herein. To that end, as a non-limiting example, data storage system 100 includes a storage controller 120, and a storage medium 130, and is used in conjunction with a computer system 110. In some embodiments, storage medium 130 includes a single memory device (e.g., a volatile memory device or a non-volatile memory ("NVM") device such as magnetic disk storage device, optical disk storage device, a flash memory device, a three-dimensional ("3D") memory device, or other NVM memory device) while in other implementations storage medium 130 includes a plurality of memory devices. In some embodiments, storage medium 130 includes NAND-type flash memory or NOR-type flash memory. Further, in some embodiments, storage controller 120 is a solid-state drive ("SSD") controller. However, one or more other types of storage media may be included in accordance with aspects of a wide variety of embodiments.

Computer system 110 is coupled to storage controller 120 through data connections 101. However, in some embodiments computer system 110 includes storage controller 120 as a component and/or a sub-system. Computer system 110 may be any suitable computer device such as a computer, a laptop computer, a tablet device, a wearable computing device, a netbook, an internet kiosk, a personal digital assistant, a mobile phone, a smart phone, a gaming device, a computer server, or any other computing device. Computer system 110 is sometimes called a host or host system. In some embodiments, computer system 110 includes one or more processors, one or more types of memory, a display and/or other user interface components such as a keyboard, a touch screen display, a mouse, a track-pad, a digital camera and/or any number of supplemental devices to add functionality.

Storage medium 130 is coupled to storage controller 120 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 120 and storage medium 130 are included in the same device as components thereof. Furthermore, in some implementations storage controller 120 and storage medium 130 are embedded in a host device, such as a mobile device, tablet, other computer or computer controlled device, and the methods described herein are performed by the embedded storage controller. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers.

In some embodiments, storage medium 130 comprises persistent memory (e.g., non-volatile memory such as flash memory), and storage medium 130 includes a subset or a superset of the following data structures or data regions: persistent key-map 132; log stream 134; and datastore 136. In some embodiments, datastore 136 comprises one or more NVM devices such as magnetic disk storage device(s), optical disk storage device(s), flash memory device(s), 3D memory device(s) (as further described herein), or other non-volatile solid state storage device(s). Storage medium 130 and its included data structures or data regions (e.g., persistent key-map 132, log stream 134, and datastore 136) are described below in more detail with reference to FIG. 2B.

In some embodiments, storage medium 130 is divided into a number of addressable and individually selectable blocks (sometimes also herein called "slabs"). In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

For example, one block comprises a predetermined number of pages, for example, 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 130.

In some embodiments, storage controller 120 includes a management module 140, an input buffer 123, an output buffer 124, an error control module 125 and a storage medium interface (I/O) 128. Storage controller 120 may include various additional features that have not been illustrated for the sake of brevity and so as not to obscure more pertinent features of the example embodiments disclosed herein, and that a different arrangement of features may be possible. Input buffer 123 and output buffer 124 provide an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 140 includes one or more processing units (CPU(s), also sometimes called one or more processors) 122 configured to execute instructions in one or more programs (e.g., stored in memory 302 (FIG. 3) of management module 140) and in-memory 144. In some embodiments, one or more CPUs 142 are shared by one or more components within, and in some cases, beyond the function of storage controller 120. In some embodiments, in-memory 144 comprises a portion of the memory associated with management module 140, and in-memory 144 comprises one or more volatile memory devices. For example, the one or more volatile memory devices comprising in-memory 144 include high-speed random access memory such as DRAM, SRAM, DDR RAM, or other random access solid state memory devices. Management module 140 is coupled to input buffer 123, output buffer 124 (connection not shown), error control module 125 and storage medium I/O 128 in order to coordinate the operation of these components.

Error control module 125 is coupled to storage medium I/O 128, input buffer 123 and output buffer 124. Error control module 125 is provided to limit the number of uncorrectable errors inadvertently introduced into data. In some embodiments, error control module 125 is executed in software by one or more CPUs 122 of management module 140, and, in other embodiments, error control module 125 is implemented in whole or in part using special purpose circuitry to perform encoding and decoding functions. To that end, error control module 125 includes an encoder 126 and a decoder 127. Encoder 126 encodes data by applying an error control code to produce a codeword, which is subsequently stored in storage medium 130.

When the encoded data (e.g., one or more codewords) is read from storage medium 130, decoder 127 applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, input buffer 123 receives data to be stored in storage medium 130 from computer system 110 (e.g., write data). The data held in input buffer 123 is made available to encoder 126, which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands on control line 111 to storage controller 120 requesting data from storage medium 130. Storage controller 120 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to decoder 127. If the decoding is successful, the decoded data is provided to output buffer 124, where the decoded data is made available to computer system 110. In some embodiments, if the decoding is not successful, storage controller 120 may resort to a number of remedial actions or provide an indication of an irresolvable error condition.

FIG. 2A is a block diagram illustrating data structures or data regions associated with management module 140 in accordance with some embodiments. In some embodiments, the data structures or data regions are stored in in-memory 144 of management module 140, which comprises one or more volatile memory devices. For example, the one or more volatile memory devices comprising in-memory 144 include high-speed random access memory such as DRAM, SRAM, DDR RAM, or other random access solid state memory devices. In some embodiments, in-memory 144 includes a subset or a superset of the following data structures or data regions: non-persistent key-map 202; log record buffer 204; cache 206; transaction table 208; and memory operations buffer 210.

In FIG. 2A, non-persistent key-map 202 includes a plurality of entries mapping keys to locations in datastore 136. For example, entry 212 maps respective key information associated with a data object stored in datastore 136 to location information. In some embodiments, the location information includes a pointer to a location in datastore 136 or a location in datastore 136. In some embodiments, the key information includes a unique key or information from which a unique key can be identified such as a shortened key and a location/length of a key prefix. In some embodiments, the location information includes an identifier number of a leaf node in a respective tiered data structure of the one or more tiered data structures stored in datastore 136, where the data object associated with the key information is included in the leaf node. In some embodiments, the location information is an index number associated with a slab in datastore 136 that stores the leaf node to which the data object associated with the key information belongs.

For example, management module 140 receives, from computer system 110, a request to perform a transaction including two or more memory operations on datastore 136. In this example, a first memory operation includes replacing the value of a data object stored in datastore 136 that corresponds to key 77 with a new value. Continuing with this example, management module 140 locates the data object in datastore 136 associated with the first memory operation by mapping key 77 in non-persistent key-map 202 to location information pointing to or giving the location of the data object in datastore 136. For example, key 77, in non-persistent key-map 202, is mapped to an index number for a slab in datastore 136 that stores a leaf node that includes the data object corresponding to key 77.

In FIG. 2A, log record buffer 204 includes one or more operation commit records associated with pending memory operations being performed on datastore 136. In some embodiments, an operation commit record is populated and stored in log record buffer 204 prior to the operation commit record being written to log stream 134 in storage medium 130. With reference to the above example, management module 140 populates an operation commit record for the first memory operation that includes a subset or a superset of the following: a transaction identifier associated with the request to perform the transaction; key 77; location information pointing to the index number of the old slab in datastore 136 that stored the data object prior to the first memory operation; and location information pointing to the index number of the new slab in datastore 136 storing the data object after the first memory operation.

In FIG. 2A, cache 206 stores nodes and/or data objects retrieved from a respective tiered data structure of the one or more tiered data structures stored in datastore 136. In some embodiments, cache 206 optionally includes data object cache portion 212, storing data objects retrieved from datastore 136, and node cache portion 214, storing nodes retrieved from datastore 136. With respect to the example above, management module 140 stores in node cache portion 214 of cache 206 nodes of a respective tiered data structure that were traversed in order to locate the data object corresponding to key 77, and management module 140 also stores in data object cache portion 212 of cache 206 the data object corresponding to key 77.

In FIG. 2A, transaction table 208 stores entries associated with each request to perform a transaction received from a requestor (e.g., computer system 110, FIG. 1). With reference to the above example, in response to receiving the request from computer system 110 to perform a transaction including two or more memory operations on datastore 136, management module 140 stores entry 214 in transaction table 208. In some embodiments, a respective entry in transaction table 208 includes a unique transaction identifier and a timestamp corresponding to the time the transaction request was received or the time the entry was created. In some embodiments, when the transaction is complete and after a transaction commit record is written to log stream 134, management module 140 deletes the entry corresponding to the complete transaction from transaction table 208.

In FIG. 2A, memory operations buffer 210 stores a number of entries corresponding to the number of pending memory operations. For example, entry 216, corresponding to a respective pending memory operation, includes a memory operation type identifier (e.g., replace/update, delete, or insert/create), key information corresponding to a data object subject to the respective memory operation, and, in some circumstances, a value for the data object subject to the respective memory operation.

Figure 2B:
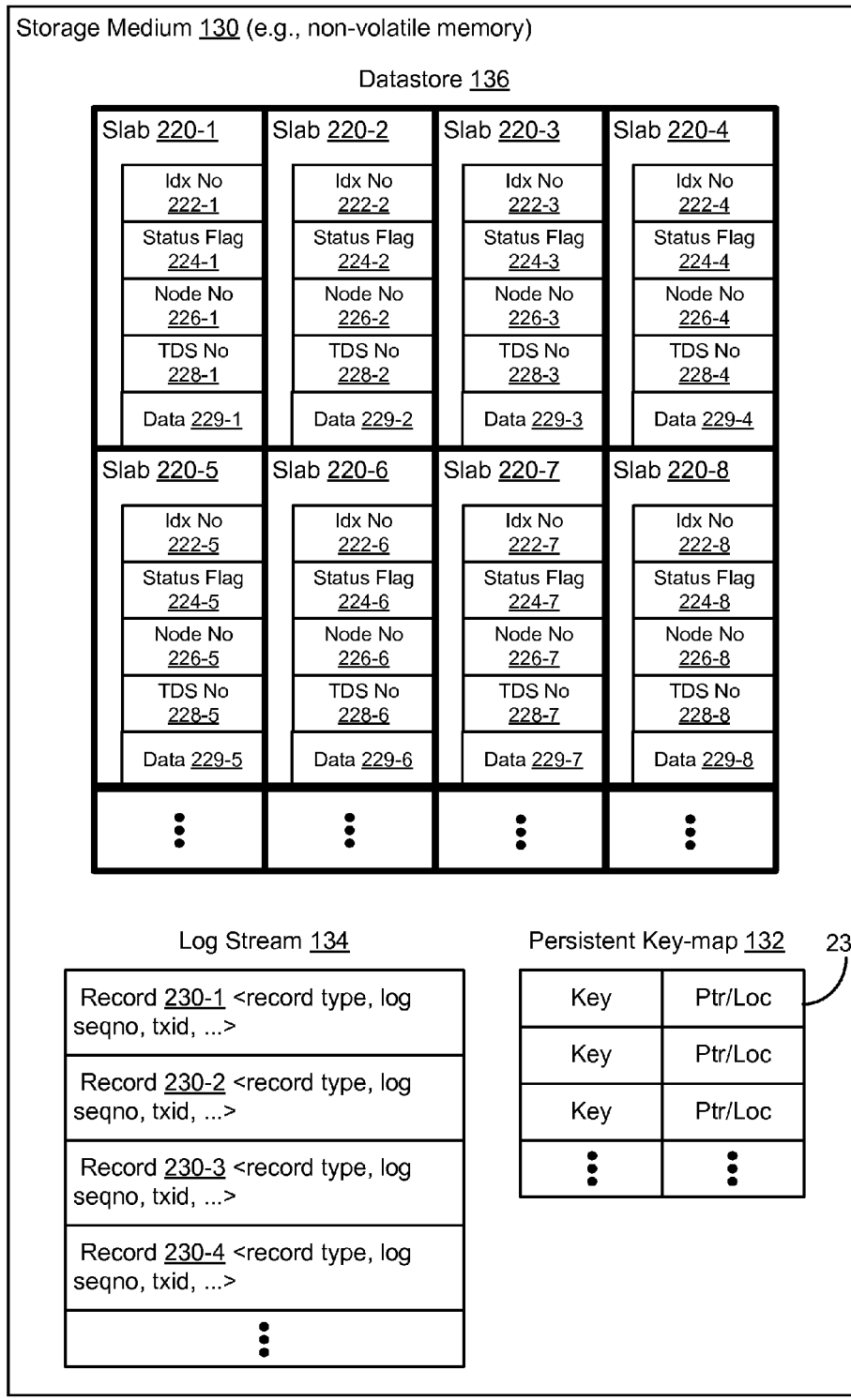
FIG. 2B is a block diagram illustrating data structures associated with a storage medium in accordance with some embodiments.

FIG. 2B is a block diagram illustrating data structures or data regions stored in storage medium 130 in accordance with some embodiments. In some embodiments, storage medium 130 includes one or more non-volatile memory devices such as magnetic disk storage device(s), optical disk storage device(s), flash memory device(s), 3D memory device(s), or other non-volatile solid state storage device(s). In some embodiments, storage medium 130 includes a subset or a superset of the following data structures or data regions: datastore 136; persistent key-map 132; and log stream 134.

In FIG. 2B, datastore 136 includes a plurality of slabs 220. In some embodiments, slabs 220 are all a predetermined size. For example, slabs 220 are each 8 KB in size. Alternatively, in some embodiments, slabs 220 are one of a number of predetermined sizes. In one example, slabs 220 are allocated in four predetermined sizes: 8 KB, 16 KB, 32 KB, and 64 KB. In some embodiments, datastore 136 is organized into one or more tiered data structures. In some embodiments, a respective tiered data structure ("TDS") includes a plurality of nodes with one root node, zero or more internal nodes, and one or more leaf nodes. Each of the nodes (e.g., root, internal, and leaf nodes) comprising the respective TDS is stored in a separate slab 220, and each of the leaf nodes of the respective TDS includes one or more data objects.

In FIG. 2B, each of slabs 220 at least includes a unique index number 222 and a status flag 224 indicating whether the slab is free (i.e., neither occupied by nor storing a node) or occupied by a node of one of the one or more tiered data structures stored in datastore 136. In some embodiments, a respective free slab 220 only includes a unique index number 222 and a status flag 224 indicating that respective free slab 220 is free. In some embodiments, a respective occupied slab 220 further includes a node number 226 of a respective node in a respective TDS of the one or more tiered data structures that is stored at respective occupied slab 220, a tiered data structure number 228 corresponding to the respective TDS of the one or more tiered data structures that includes the respective node, and data 229.

In some embodiments, data 229 includes one or more data objects included in the respective node. In some embodiments, a respective data object comprises key information and a corresponding value. In some embodiments, the key information includes a unique key or information from which a unique key can be identified such as a shortened key and a location/length of a key prefix. In some embodiments, the corresponding value is data. In some embodiments, the corresponding value is a pointer identifying a location where the data is stored. In some embodiments, the one or more data objects included in the respective node are contiguous data objects where the unique key information for a respective contiguous data object is adjacent or substantially adjacent to the corresponding value for the respective contiguous data object or other data for the respective contiguous data object that is adjacent to the corresponding value. In some embodiments, the one or more data objects included in the respective node are split data objects where the unique key information for a respective split data object is separated from the corresponding value for the respective split data object by other data for other data objects and the unique key information for the respective split data object is stored with a pointer that identifies a location of the corresponding value for the respective split data object.

In FIG. 2B, persistent key-map 132 includes a plurality of entries mapping keys to locations in datastore 136. For example, entry 232 maps respective key information associated with a data object stored in datastore 136 to location information. In some embodiments, the location information includes a pointer to a location in datastore 136 or a location in datastore 136. In some embodiments, the key information includes a unique key or information from which a unique key can be identified such as a shortened key and a location/length of a key prefix. In some embodiments, the location information includes an identifier number of a leaf node in a respective tiered data structure of the one or more tiered data structures stored in datastore 136, where the data object associated with the key information is included in the leaf node. In some embodiments, the location information is an index number associated with a slab in datastore 136 that stores the leaf node to which the data object associated with the key information belongs.

In FIG. 2B, log stream 134 includes a plurality of records 230 (e.g., 230-1, 230-2, 230-3, 230-4, . . . ). A respective record 230 is associated with a record type: start transaction record, transaction commit record, or operation commit record. An operation commit record is associated with one of three memory operations types performed on datastore 126: replacement, deletion, or insertion. A respective record 230 at least includes the record type, a unique sequence number (i.e., seqno), and a transaction identifier (i.e., txid). In some embodiments, unique sequence numbers are assigned to records 230 in monotonically ascending order.

In some embodiments, records 230 each corresponds to a transaction that is associated with a transaction identifier. In some embodiments, a respective complete transaction corresponds to a first start transaction record in log stream 134 that includes a first transaction identifier and a first transaction commit record in log stream 134 that includes the first transaction identifier. In some embodiments, the respective complete transaction also corresponds to one or more operation commit records that include the first transaction identifier. In some embodiments, a respective incomplete transaction corresponds to a second start transaction record in log stream 134 that includes a second transaction identifier for which there is not a corresponding transaction commit record in log stream 134 that includes the second transaction identifier. In some embodiments, the respective incomplete transaction also corresponds to zero or more operation commit records that include the second transaction identifier.

In some embodiments, a respective start transaction record in log stream 134 includes a unique log sequence number and a transaction identifier (e.g., corresponding to the transaction to which the respective start transaction record belongs). In some embodiments, a respective transaction commit record in log stream 134 includes a unique log sequence number and a transaction identifier (e.g., corresponding to the transaction to which the respective transaction commit record belongs).

In some embodiments, a first example operation commit record in log stream 134, that corresponds to a replacement operation of a first data object, includes a unique log sequence number, a transaction identifier (e.g., corresponding to the transaction to which the first operation commit record belongs), key information corresponding to the first data object, a pointer to the old location of the first data object in datastore 136 (e.g., the slab storing the leaf node with the old first data object prior to the replacement operation), and a pointer to the new location of the first data object in datastore 136 (e.g., the slab storing the leaf node with the new first data object after the replacement operation). In some embodiments, a second example operation commit record in log stream 134, that corresponds to a deletion operation of a second data object, includes a unique log sequence number, a transaction identifier (e.g., corresponding to the transaction to which the second operation commit record belongs), key information corresponding to the second data object, a pointer to the old location of the second data object (e.g., the slab storing the leaf node with the old second data object prior to the deletion operation), and a pointer to a new location in datastore 136 (e.g., the slab storing the leaf node with the new second data object with a tombstone after the deletion operation). In some embodiments, a third example operation commit record in log stream 134, that corresponds to an insertion operation of a third data object, includes a unique log sequence number, a transaction identifier (e.g., corresponding to the transaction to which the third operation commit record belongs), key information corresponding to the third data object, a pointer to old location of the third data object in datastore 136 (e.g., the slab storing the leaf node with the new third data object after the insertion operation).

FIG. 3 is a block diagram illustrating an implementation of management module 140 in accordance with some embodiments. Management module 140 typically includes one or more processors 142 (also sometimes called CPU(s), processing unit(s), microprocessor(s), microcontroller(s), or core(s)) for executing modules, programs and/or instructions stored in memory 302 and thereby performing processing operations, memory 302, one or more communication interfaces 304, one or more storage interfaces 308, and one or more communication buses 306 for interconnecting these components. One or more communication buses 306 optionally include circuitry (sometimes called a chipset) that interconnects and controls communications between system components. In some embodiments, management module 140 is operatively coupled with storage medium 130 by one or more communication buses 306 and one or more storage interfaces 308 (e.g., storage medium I/O 128 such as a PCI bus, PCIe bus, or the like). In some embodiments, management module 140 is operatively coupled with internal requestor(s) and/or external requestors (e.g., computer system 110) by one or more communication buses 306 and one or more communication interfaces 304. Memory 302 includes one or more semiconductor memory devices such as high-speed random access memory (e.g., DRAM, SRAM, DDR RAM or other random access solid state memory devices), and may include non-volatile memory (e.g., one or more NVM devices such as magnetic disk storage device(s), optical disk storage device(s), flash memory device(s), 3D memory device(s), or other non-volatile solid state storage device(s)). Memory 302 optionally includes one or more storage devices remotely located from one or more processors 142. Memory 302, or alternately the non-volatile memory device(s) within memory 302, comprises a non-transitory computer readable storage medium. In some embodiments, memory 302, or the computer readable storage medium of memory 302 stores the following programs, modules, and data structures, or a subset thereof:

operating logic 310 includes procedures for handling various basic system services and for performing hardware dependent tasks;

communications module 312 that is used for communicating with other computer systems or computer components (e.g., one or more communication interface 304 and one or more storage interfaces 308);

request handling module 314 for detecting and processing requests received from internal requestors and/or external requestors (e.g., computer system 110, FIG. 1);

cache management module 320 for storing and retrieving information (e.g., data objects and nodes) from cache 206, optionally including:

cache storage module 322 for storing information (e.g., data objects and nodes) in cache 206;

cache search module 324 for performing searches based on requested information (e.g., a search for a requested data object or retrieving a node for use in searching for a requested data object) in cache 206; and cache eviction policies 326 for determining which information (e.g., data objects and/or nodes) to evict from cache 206;

tiered data structure ("TDS") module 330 for storing and retrieving information (e.g., data objects and nodes) within one or more tiered data structures stored in datastore 136 (e.g., TDS 400, FIG. 4A), optionally including:

TDS storage module 332 for performing memory operations (e.g., replacement, deletion, and insertion operations) by writing information (e.g., inserting a new data object or replacing/updating the value of a data object) to leaf nodes stored in cache 206 or deleting information (e.g., deleting a data object and/or replacing the value of a data object with a tombstone) from leaf nodes stored in cache 206 so as to create new/modified leaf nodes and writing the new/modified leaf nodes to datastore 136;

TDS search module 334 for searching through the one or more tiered data structures for requested data (e.g., locating and retrieving a data object or node corresponding to a memory operation in a transaction requested by a requestor);

metadata generator 336 for generating metadata for data objects that are stored in leaf nodes of the one or more tiered data structures, where the metadata enables the data objects to be located with TDS search module 334 in response to transaction requests from requestors;

response generator 342 for generating responses to requests from internal and/or external requestors based on data retrieved in response to the requests;

allocation module 344 for allocating free slabs in datastore 136 for which to write a new/modified leaf node of a TDS;

mapping module 345 for updating non-persistent key-map 202 and persistent key-map 132;

log record module 346 for managing zero or more pending operation commit records in log record buffer 204 and for writing an operation commit records from log record buffer 204 to log stream 134;

pre-processing module 348 for batching memory operations in memory operations buffer 210 and determining an optimized minimum number of leaf nodes for the batched memory operations; and in-memory 144 storing information in volatile memory, including but not limited to the following data structures:

non-persistent key-map 202 for mapping key information to location information (e.g., a slab index number) associated with the location of a data object in datastore 136 that corresponds to the key information (and, in turn, the location of a leaf node to which the data object belongs);

log record buffer 204 storing one or more operation commit records associated with pending memory operations being performed on datastore 136;

cache 206 storing nodes and/or data objects retrieved from the one or more tiered data structures stored in datastore 136, optionally including:

data object cache portion 212 storing zero or more data objects retrieved from the one or more tiered data structures stored in datastore 136; and node cache portion 214 storing zero or more nodes retrieved from the one or more tiered data structures stored in datastore 136;

transaction table 208 storing entries associated with each request to perform a transaction received from a requestor (e.g., computer system 110, FIG. 1); and memory operations buffer 210 including zero or more entries for pending memory operations.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 302 may store a subset of the modules and data structures identified above. Furthermore, memory 302 may store additional modules and data structures not described above. In some embodiments, the programs, modules, and data structures stored in memory 302, or the computer readable storage medium of memory 302, provide instructions for implementing respective operations in the methods described below with reference to FIGS. 9A-9D.

Although FIG. 3 shows management module 140, FIG. 3 is intended more as a functional description of the various features which may be present in a non-volatile computer system than as a structural schematic of the embodiments described herein. In practice, and as recognized by those of ordinary skill in the art, items shown separately could be combined and some items could be separated.

Figure 4A:
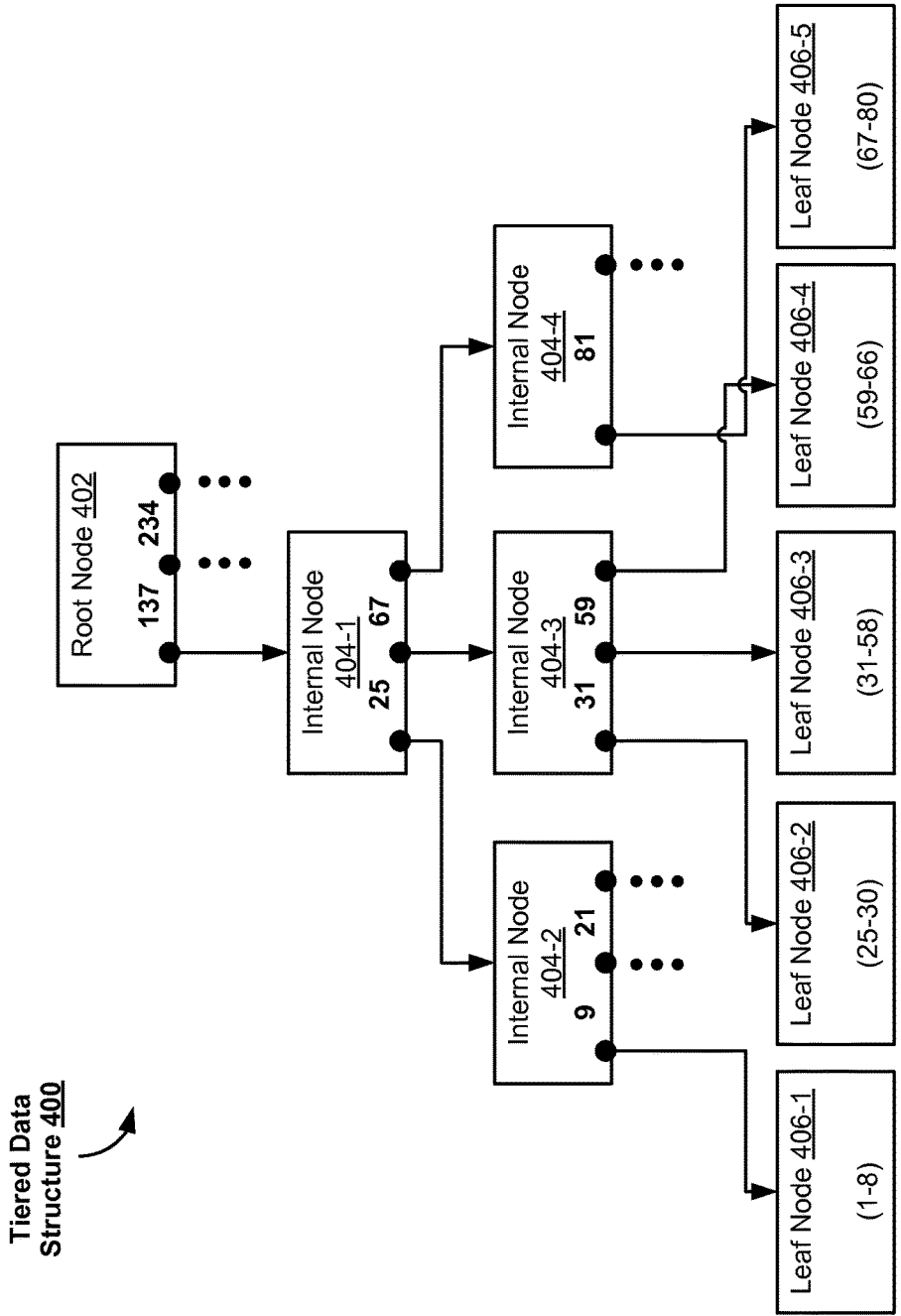
FIG. 4A illustrates an example of a tiered data structure in accordance with some embodiments.

FIG. 4A illustrates an example of a tiered data structure in accordance with some embodiments. Tiered data structure 400 includes a plurality of nodes. The plurality of nodes are organized in a tiered structure in which each respective node is connected to one or more other nodes in levels (tiers) above and/or below the respective node. A parent node for a respective node in tiered data structure 400 is a node that is a level (tier) above the respective node in tiered data structure 400 and refers to the respective node. A child node for a respective node in tiered data structure 400 is a node that is a level (tier) below the respective node in tiered data structure 400 and refers to the respective node. Two nodes are at the same level if they have a same number of nodes to traverse to reach root node 402. Root node 402 is an external node that has no parent node, typically there is only one root node for tiered data structure 400. Internal nodes 404 are nodes that have both a parent node and one or more child nodes and are thus internal to the tiered data structure. Leaf nodes 406 are nodes that do not have child nodes and are thus "external" nodes. Root node 402 and internal nodes 404 include references that indicate which child nodes are associated with a particular range of data. For example, root node 402 in FIG. 4A indicates that internal node 404-1 is associated with data with keys between 1 and 136. Internal node 404-1 indicates that: internal node 404-2 is associated with data objects having keys between 1 and 24; internal node 404-3 is associated with data objects having keys between 25 and 66; and internal node 404-4 is associated with data objects having keys between 67 and 136. Similarly, internal node 404-3 indicates that: leaf node 406-2 includes data with keys between 25 and 30; leaf node 406-3 includes data with keys between 31 and 58; and leaf node 406-4 includes data with keys between 59 and 66, and so on.

Navigating the tiered data structure typically, but optionally, relies on the assumption that keys are always sorted in a predefined key order (e.g., monotonically ascending), so that a node that is associated with data having keys between a first value and a second value is associated with all data in the tiered data structure that has keys between the first value and the second value. In some embodiments, each leaf node has a maximum size and when the leaf node exceeds the maximum size, the leaf node is split into two leaf nodes. In some embodiments, each leaf node has a minimum size and when a leaf node is below the minimum size, the leaf node is combined with one or more other leaf nodes. In some embodiments, each non-leaf node (e.g., root node or internal node) has a maximum number of child nodes, and when splitting of a leaf node results in a non-leaf node having more than the maximum number of child nodes, the non-leaf node is split to accommodate the extra child nodes. In some embodiments, each non-leaf node (e.g., root node or internal node) has a minimum number of child nodes, and when a combining two or more leaf nodes results in a non-leaf node having less than the minimum number of child nodes, the non-leaf node is combined with one or more other non-leaf nodes to accommodate the reduced number of child nodes. The tiered data structure may additionally conform to some or all of the rules associated with B-Trees, B+Trees, B*Trees or other tiered data structures.

Figure 4B:
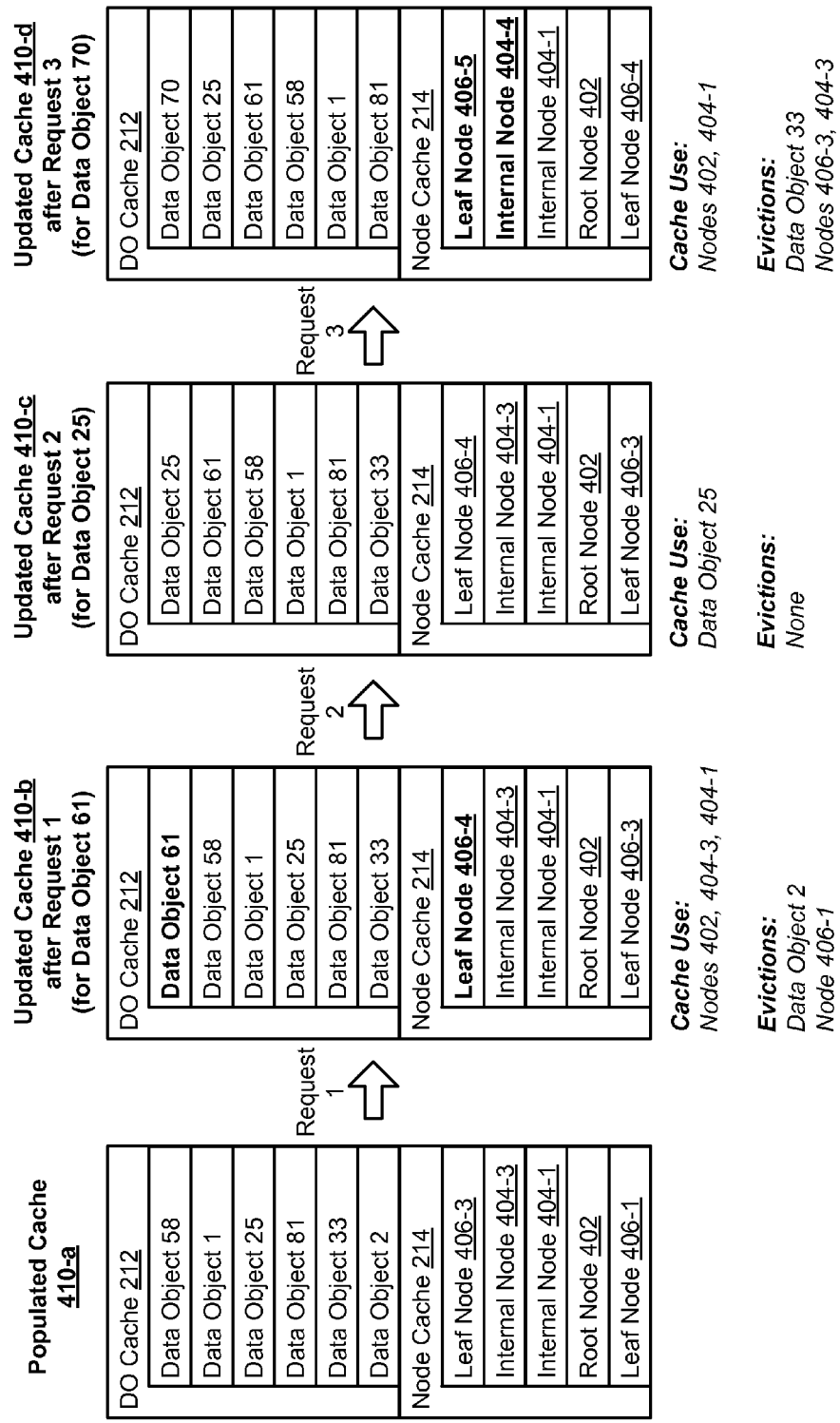
FIGS. 4B-4E illustrate the performance of example operations on the example tiered data structure in FIG. 4A in accordance with some embodiments.

FIG. 4B illustrates an example of efficient cache utilization in a tiered data structure in accordance with some embodiments. In FIG. 4B, populated cache 410-a is an example of cache 206 from FIG. 2A that is populated with one or more data objects and one or more nodes that were retrieved to respond to prior requests for data objects by one or more internal or external requestors. For example, one of the prior requests was a request for data object 58, so management module 140 traversed through tiered data structure 400 in FIG. 4A by traversing, in sequence, root node 402, internal node 404-1, internal node 404-3 to identify and retrieve leaf node 406-3, which includes data object 58. After retrieving data object 58, data object 58 is cached in data object cache portion 212 and the traversed nodes are cached in node cache portion 214. In FIG. 4B, the data objects in the populated cache 410 are shown in order of "staleness" where more stale data objects are near the bottom of data object cache portion 212 and less stale (e.g., fresher) data objects are near the top of data object cache portion 212, as data objects are refreshed, they are reordered in the cache to represent their staleness, even though the data objects are, in many circumstances, not actually moved within the cache. Similarly, in FIG. 4B, the nodes in the populated cache 410 are shown in order of "staleness" where more stale nodes are near the bottom of node cache portion 214 and less stale (e.g., fresher) data objects are near the top of node cache portion 214, as nodes are refreshed, they are reordered in the cache to represent their staleness, even though nodes are, in many circumstances, not actually moved within the cache.

In FIG. 4B, in response to a request (e.g., "request 1") for data object 61, management module 140 determines that data object 61 is not in data object cache portion 212 in populated cache 410-a. Subsequently, management module 140 traverses through tiered data structure 400 in FIG. 4A by traversing, in sequence, root node 402, internal node 404-1, internal node 404-3 to identify and retrieve leaf node 406-4, which includes data object 61. When traversing tiered data structure 400, management module 140 is able to use a number of cached nodes to improve response time (e.g., by using root node 402, internal node 404-1 and internal node 404-3 to determine that leaf node 406-4 has be retrieved from tiered data structure 400). Management module 140 caches the traversed nodes in node cache portion 214 and caches data object 61 in data object cache portion 212 as shown in updated cache 410-b in FIG. 4B. In order to make room for the traversed nodes and retrieved data object, data object 2 and leaf node 406-1 are evicted from cache 206 in accordance with a cache eviction policy, as shown in updated cache 410-b in FIG. 4B.

In FIG. 4B, in response to a request (e.g., "request 2") for data object 25, management module 140 determines that data object 25 is in data object cache portion 212 in populated cache 410-b. As data object 25 is already in data object cache portion 212, management module 140 does not traverse tiered data structure 400 to retrieve data object 25, because data object 25 is retrieved from cache 206. In conjunction with being retrieved, data object 25 is refreshed in data object cache portion 212 so that it is less stale than object 61 rather than being more stale than data object 61, as shown in updated cache 410-c in FIG. 4B. In some embodiments, data object 25 is identified in data object cache portion 212 using a hash table to locate a portion of data object cache portion 212 that includes data object 25. As no new data objects or nodes were added to cache 206, no data objects or nodes are evicted from cache 206.

In FIG. 4B, in response to a request (e.g., "request 3") for data object 70, management module 140 determines that data object 70 is not in data object cache portion 212 in populated cache 410-c. Subsequently, management module 140 traverses through tiered data structure 400 in FIG. 4A by traversing, in sequence, root node 402, internal node 404-1, internal node 404-4 to identify and retrieve leaf node 406-5, which includes data object 70. When traversing tiered data structure 400, management module 140 is able to use a number of cached nodes to improve response time (e.g., by using root node 402 and internal node 404-1 to determine that internal node 404-4 and leaf node 406-5 have to be retrieved from tiered data structure 400). Management module 140 caches the traversed nodes in node cache portion 214 and caches data object 70 in data object cache portion 212 as shown in updated cache 410-d in FIG. 4B. In order to make room for the traversed nodes and retrieved data object, data object 33, internal node 404-3, and leaf node 406-3 are evicted from cache 206 in accordance with a cache eviction policy, as shown in updated cache 410-d in FIG. 4B.

While the preceding examples have been shown with a small number of data objects and nodes, it should be understood that in a typical cache, a much larger number of data objects and nodes are stored in the cache and similar processes are performed. For example, in an 2 GB DRAM cache with a 1 GB data object cache portion, a 1 GB node cache portion, an average node size of 8 KB and an average data object size of 1 KB, the data object cache portion would hold approximately 1 million data objects and the node cache portion would hold approximately 250,000 nodes. In some embodiments, only internal nodes 404 are cached in node cache portion 214. In some embodiments, root node 402 and leaf nodes 406 are cached in node cache portion 214, but most leaf nodes are quickly evicted from node cache portion 214, while internal nodes 404 are frequently used and are thus frequently refreshed in cache 206, so that node cache portion 214 includes primarily internal nodes 404 during normal operation (e.g., 50% or more of the capacity of node cache portion 214 is occupied by internal nodes). Using a data object cache in addition to a node cache instead of solely using a node cache improves the performance of the cache by increasing the likelihood that a requested data object will be available from the cache. For example, using a 1 GB data object cache in addition to a 1 GB node cache approximately quadruples the object capacity of the cache as compared with a 2 GB node cache.

Figure 4C:
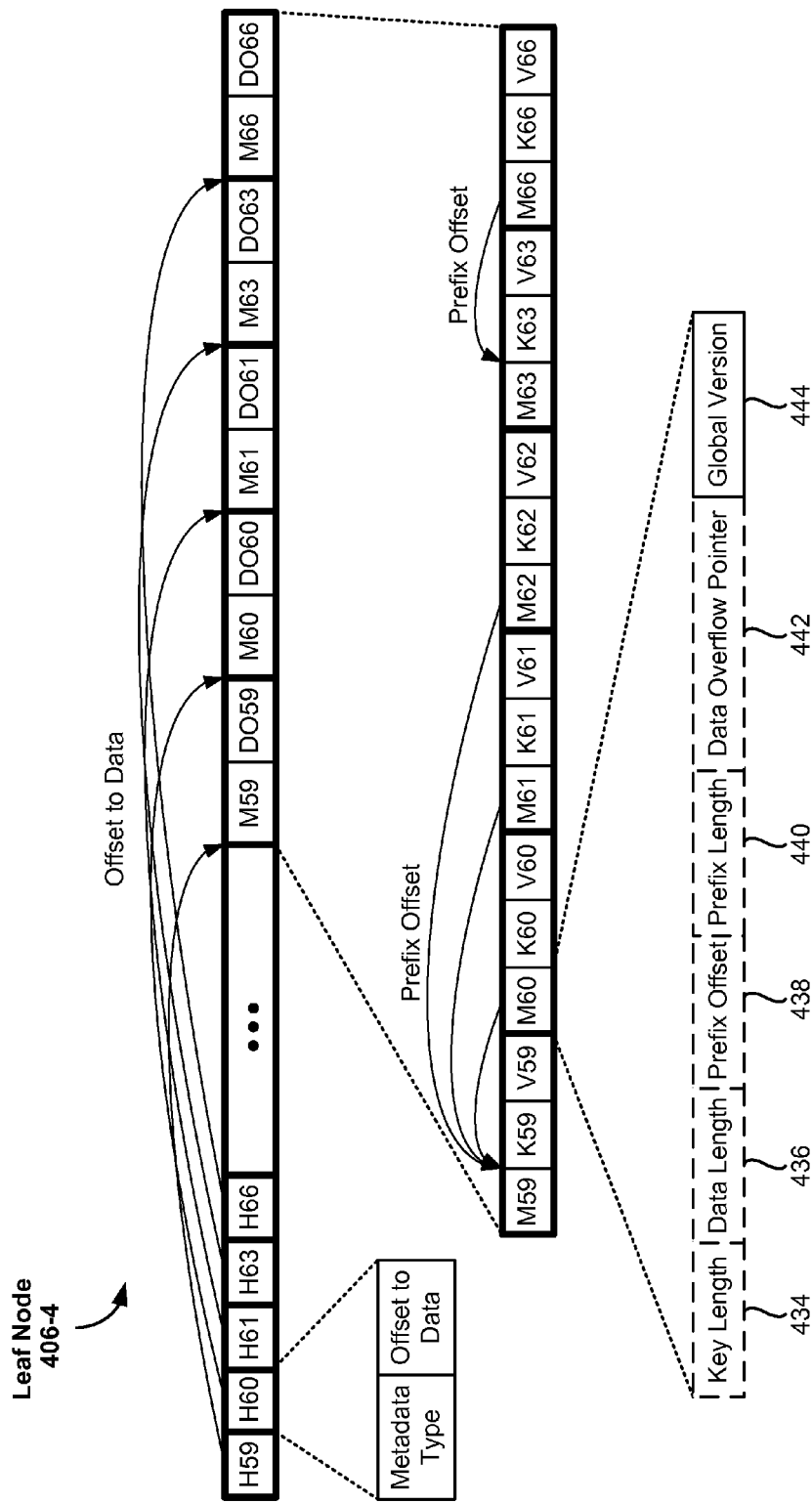
Figure 4D:
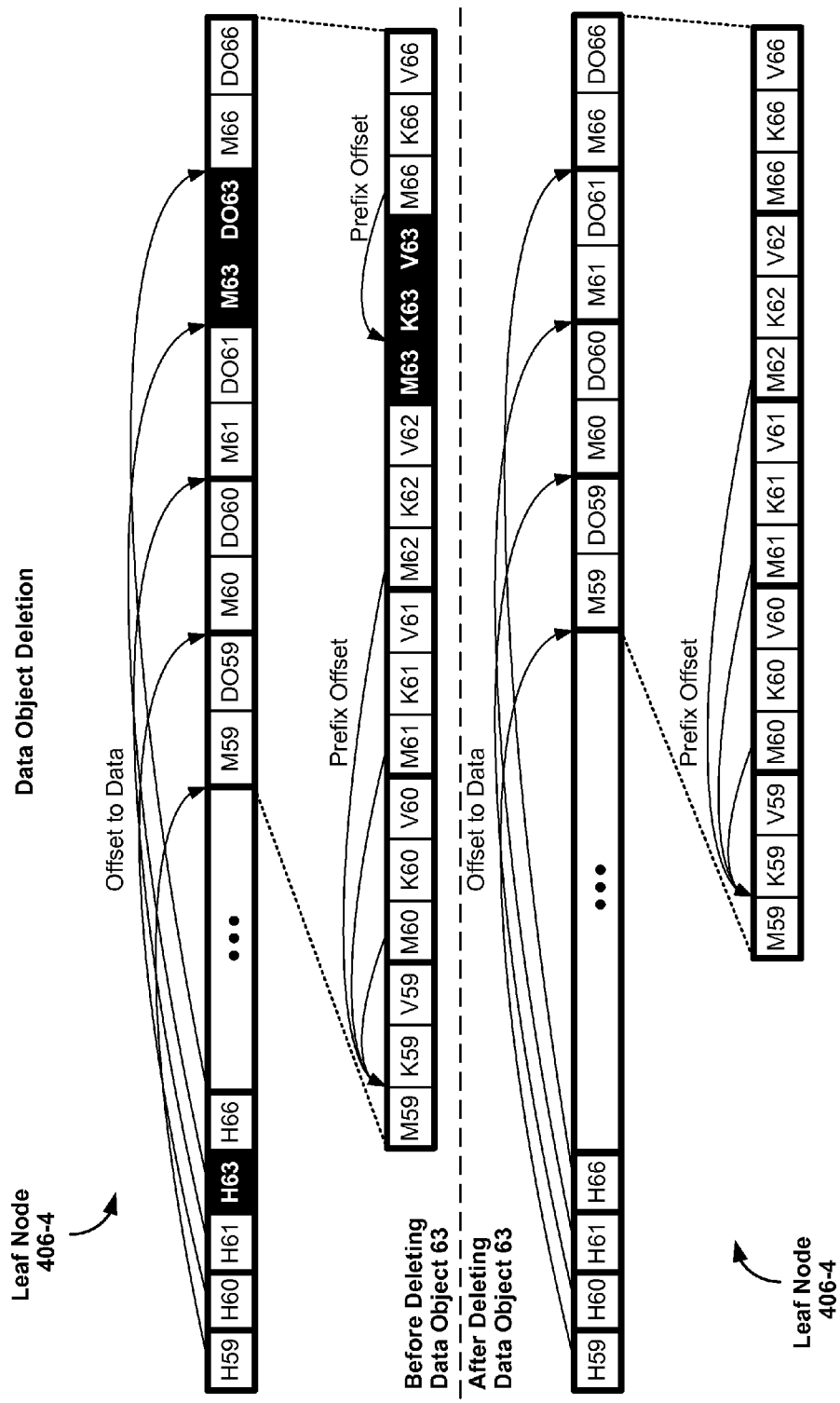
Figure 4E:
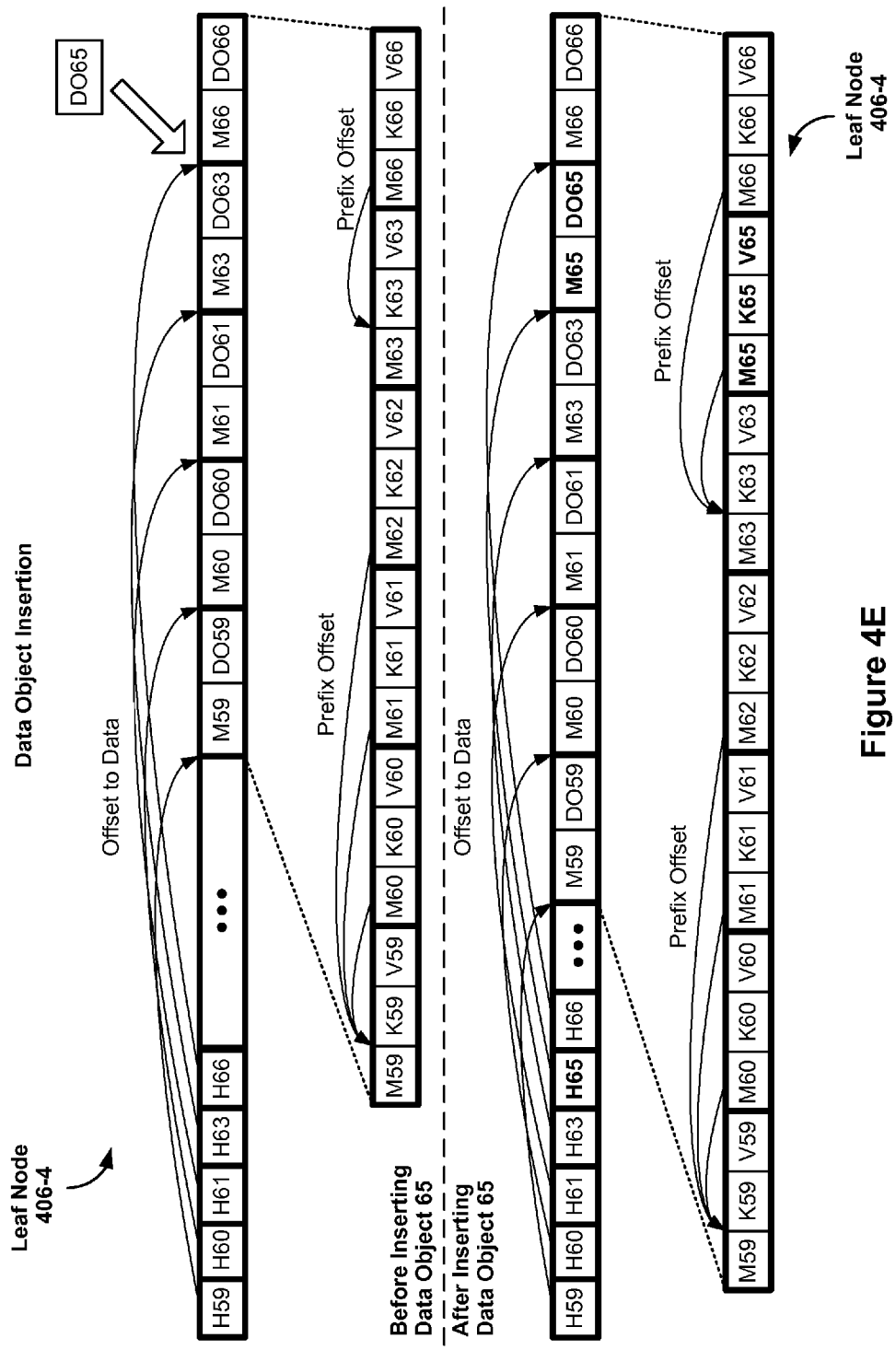

FIGS. 4C-4E illustrate examples of compaction of information in a tiered data structure in accordance with some embodiments. FIG. 4C shows an example leaf node 406-4 from tiered data structure 400 in FIG. 4A. Leaf node 406-4 includes data for data objects 59, 60, 61, 63 and 66. For each of these data objects (e.g., DO59, DO60, DO61, DO63, DO66), leaf node 406-4 includes a corresponding fixed length header (H59, H60, H61, H63, and H66, respectively) and corresponding metadata (e.g., M59, M60, M61, M63, and M66, respectively). The fixed length headers include a metadata type in embodiments where there are a plurality of different metadata types for metadata of the data objects, and an offset (e.g., a number of bytes) from a particular portion of the leaf node (e.g., a beginning or an end of the leaf node) to the location of the data object in the leaf node. The fixed length headers each have the same length, and can, thus, be used to perform a binary search through data objects in the leaf node. In some embodiments, the fixed length headers are packed to the left in the leaf node and the data objects and metadata are packed to the right in the leaf node, so that there is a growing area in the middle of the leaf node that increases or decreases in size as additional data objects are added to, or removed from, the leaf node. Packing the headers and data objects in different directions enables both the headers and the data objects to have fixed points to refer to when the data objects and nodes are identified by offsets (e.g., the headers can be identified based on an offset from a left edge of the leaf node, and the data objects and metadata can be identified based on an offset from a right edge of the leaf node).

The data objects (e.g., DO59, DO60, DO61, DO63, DO66) in leaf node 406-4 each include unique key information (e.g., K59, K60, K61, K63, K66, respectively) and a corresponding value (e.g., V59, V60, V61, V63, V66, respectively). In some embodiments, the unique key information for some of the data objects is a full unique key for the data objects, while the unique key information for other data objects is a portion of a unique key for the data objects, and the metadata for these data objects indicates a location of a key prefix that is shared with one or more other data objects that can be used to recreate the unique key for the data object in combination with the unique key information stored with the data object. For example, data object 59 includes a full unique key in unique key information K59, while data object 60 includes a partial key in unique key information K60 and metadata M60 associated with data object 60 is used to identify a location of a key prefix (e.g., a portion of K59 that serves as a key prefix for data object 60 and, in combination with unique key information K60 can be used to determine a unique key for data object 60). Similarly, data object 61 includes a partial key in unique key information K61 and metadata M61 associated with data object 61 is used to identify a location of a key prefix (e.g., a portion of K59 that serves as a key prefix for data object 61 and, in combination with unique key information K61 can be used to determine a unique key for data object 61).

Metadata (e.g., M59, M60, M61, M63, and M66) for a corresponding data object optionally includes one or more of the following: key length information 434 indicating a length of unique key information associated with the corresponding data object; data length information 436 indicating a length of the corresponding data object or the value of the corresponding data object; prefix offset information 438 that indicates a location of a start of a key prefix for the corresponding data object; prefix length information 440 that indicates a length of the key prefix for the corresponding data object; data overflow pointer 442 that indicates a location of data for the corresponding data object that is too large to fit in the leaf node; and global version information 444 that indicates a version of the corresponding data object. In some embodiments, global version information 444 includes information identifying the order of each change to data objects in tiered data structure 400 (FIG. 4A) or data objects in datastore 136 (FIGS. 1 and 2B), which can be used to determine whether a change to a first data object occurred before or after a change to a second, different, data object.

In some embodiments different data objects have different types of metadata with different lengths, sometimes called variable-length metadata. Using variable length metadata enables shorter metadata to be used in many situations, and using shorter metadata increases the number of data objects that can be stored in a leaf node. As one example, there are four types of metadata, type-0 metadata, type-1 metadata, type-2 metadata and type-3 metadata. Type-0 metadata is used when the data object has the same key prefix, key length, and data length as the preceding data object, in which case the metadata includes only global version information 444 (e.g., represented as a 64-bit unsigned integer), and other information such as key prefix location, data length and key length are determined by looking at the metadata corresponding to the preceding data object. Type-1 metadata is used when the data object has a key length and data length that can each fit in a single byte and data that fits in the leaf node, in which case the metadata includes key length information 434 (e.g., represented as an 8-bit unsigned integer), data length information 436 (e.g., represented as an 8-bit unsigned integer), prefix offset information 438 (e.g., represented as a 16-bit unsigned integer), prefix length information 440 (e.g., represented as an 8-bit unsigned integer), and global version information 444 (e.g., represented as a 64-bit unsigned integer). Type-2 metadata is used when the data object has a key length and data length that can each fit in two bytes, in which case the metadata includes key length information 434 (e.g., represented as a 16-bit unsigned integer), data length information 436 (e.g., represented as a 16-bit unsigned integer), prefix offset information 438 (e.g., represented as a 16-bit unsigned integer), prefix length information 440 (e.g., represented as a 16-bit unsigned integer), data overflow pointer 442 (e.g., represented as a 64-bit unsigned integer), and global version information 444 (e.g., represented as a 64-bit unsigned integer). Type-3 metadata is used for data objects that do not fit in the other categories, in which case the metadata includes key length information 434 (e.g., represented as a 32-bit unsigned integer), data length information 436 (e.g., represented as a 32-bit unsigned integer), prefix offset information 438 (e.g., represented as a 16-bit unsigned integer), prefix length information 440 (e.g., represented as a 32-bit unsigned integer), data overflow pointer 442 (e.g., represented as a 64-bit unsigned integer), and global version information 444 (e.g., represented as a 64-bit unsigned integer). Type-3 metadata is the most flexible metadata type, but is also the largest of these four metadata types. Enabling the use of other types of metadata (e.g., type-0, type-1, or type-2) saves space in the leaf node when type-3 metadata is not needed to store all of the relevant metadata for a data object. While the example above describes four types of metadata, the principles described above (e.g., using a shorter formats for metadata where the shorter format enables all of the necessary metadata information to be conveyed by the shorter metadata) would apply equally to other types of metadata and thus, in principle, any number of types of metadata could be used in an analogous manner.

FIG. 4D illustrates an example of deleting a data object from leaf node 406-4. In the upper part of FIG. 4D, before data object 63 has been deleted, leaf node 406-4 is shown with highlighting in black to indicate the information in leaf node 406-4 that will be deleted when the deletion operation is performed. After data object 63 has been deleted, header H63 is deleted from leaf node 406-4, as shown in the lower part of FIG. 4D, and the remaining headers (e.g., H59, H60, H61, and H66) are repacked against the left edge of leaf node 406-4. Additionally, after data object 63 has been deleted, data object DO63 and corresponding metadata M63 are deleted as shown in the lower part of FIG. 4D, and the remaining data objects (e.g., DO59, DO60, DO61, and DO66) and metadata (e.g., M59, M60, M61, and M66) are repacked against the right edge of leaf node 406-4. Additionally, before data object 63 was deleted, data object 66 relied on a portion of the key of data object 63 as a key prefix for data object 66. Thus, after data object 63 and its corresponding unique key information K63 is deleted, data object 66 can no longer rely on the portion of the key of data object 63 as a key prefix. Thus, in FIG. 4D, unique key information K66 for data object 66 is updated to include a full unique key for data object 66, and metadata M66 is updated to include a null value for the prefix offset information to indicate that there is no key prefix for data object 66 and that the unique key information K66 for data object 66 includes a full unique key. Alternatively, in some circumstances, management module 140 determines that there is another data object (e.g., data object 59) in leaf node 406-4 that is associated with unique key information that could be used as a new key prefix for data object 66, and unique key information K66 is updated to include a portion of the unique key for data object 66 that, when combined with the new key prefix can be used to generate the full unique key for data object 66, and metadata M66 is updated to point to unique key information (e.g., K59) for the other data object so that a portion of unique key information (e.g., K59) for the other data object can be used as a key prefix for data object 66. Additionally, in many circumstances, repacking the data objects and headers as described above after deleting data object 63 will change locations of data objects, metadata and headers relative to the locations from which offsets identifying locations of these elements are measured, and thus after a data object, header, and metadata have been deleted, management module 140 updates the offset information in the header and metadata corresponding to one or more of the other data objects (e.g., data objects that remain in leaf node 406-4 after to deleting data object 63).

FIG. 4E illustrates an example of adding a data object to leaf node 406-4. In the upper part of FIG. 4E, before data object 65 has been added, leaf node 406-4 is shown with data object DO65 that is to be added to leaf node 406-4. After data object 65 has been added, new header H65 is added in between header H63 and header H66, as shown in the lower part of FIG. 4E, and the headers (e.g., H59, H60, H61, H63, H65, and H66) are repacked against the left edge of leaf node 406-4. Additionally, after data object 65 has been added, data object DO65 and corresponding metadata M65 are added to leaf node 406-4 as shown in the lower part of FIG. 4E, and the data objects (e.g., DO59, DO60, DO61, DO63, DO65, and DO66) and metadata (e.g., M59, M60, M61, M63, M65, and M66) are repacked against the right edge of leaf node 406-4. Additionally, before data object 65 was added, data object 66 relied on a portion of the key of data object 63 as a key prefix for data object 66 and data object 63 was adjacent to metadata M66 for data object 66. Thus, after data object 65 is added in between data object 63 and data object 66, metadata M66 of data object 66 is updated to indicate a different offset for the key prefix for data object 66, because the relative position between metadata M66 and unique key information K63 has changed. Moreover, in FIG. 4E, newly added data object 65 is also able to use a portion of unique key information K63 as a key prefix, and thus metadata M65 of data object 65 is updated to identify a portion of K63 as a key prefix that can be combined with unique key information K65 to generate a full unique key for data object 65. Additionally, in many circumstances, repacking the data objects and headers as described above after adding data object 65 will change locations of data objects, metadata and headers relative to the locations from which offsets identifying locations of these elements are measured, and thus after a new data object, new header and new metadata have been inserted, management module 140 updates the offset information in the header and metadata corresponding to one or more of the other data objects (e.g., data objects that were in leaf node 406-4 prior to adding data object 65).

In some situations one or more data objects are updated without adding or deleting a data object from leaf node 406-4. However, even though a data object has not been added or deleted, updating a data object will, in some circumstances change a size of the data object (e.g., by changing a type of metadata used by the data object to a smaller or larger size of metadata or by changing a length of the data to a smaller or larger length). The change in the data object or associated metadata will, in many circumstances, change locations of data objects, metadata and headers relative to the locations from which offsets identifying locations of these elements are measured, and thus after a data object or metadata has been updated, management module 140 updates the offset information in the header and metadata corresponding to one or more of the other data objects.

Figure 5:
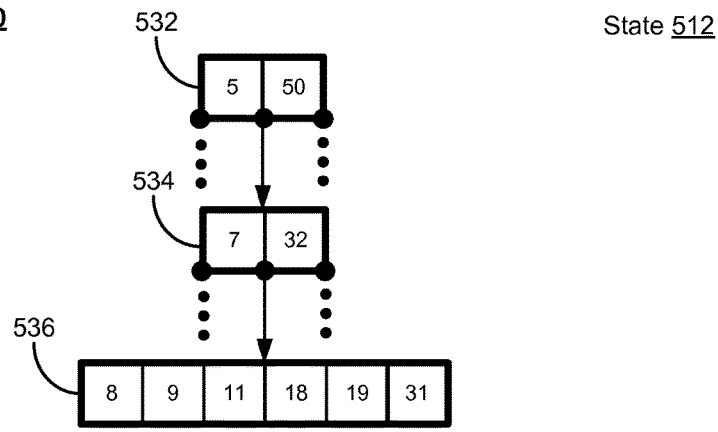
FIG. 5 illustrates the performance of a first prophetic set of batched insert operations in the data storage system in accordance with some embodiments.
Figure 5:
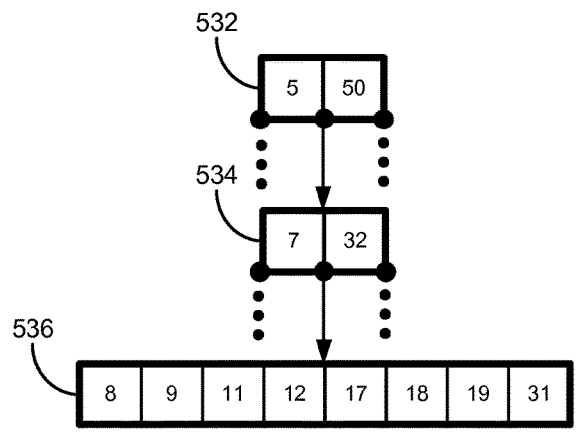

FIG. 5 illustrates the performance of a first prophetic set of insert operations on tiered data structure ("TDS") 530 in accordance with some embodiments. In FIG. 5, state 512 shows the status of memory operations buffer 210 and TDS 530 prior to management module 140 performing the memory operations included in memory operations buffer 210 on TDS 530. In state 512, root node 532 indicates that internal node 534 is associated with data with keys between 5 and 49. In state 512, internal node 534 indicates that leaf node 536 is associated with data with keys between 7 and 31. In state 512, leaf node 536 includes data with keys 8, 9, 11, 18, 19, and 31. In state 512, memory operations buffer 210 includes a first prophetic set of pending memory operations 504, including insert operations of data with keys 12 and 17.

In some embodiments, management module 140 performs pending memory operations 504 on TDS 530 in accordance with a determination that one or more conditions are satisfied. For example, a respective condition of the one or more conditions are satisfied when a predetermined time period has expired, when a predetermined number of memory operations have accumulated in memory operations buffer 210, when a predetermined number of a predefined type of memory operations have accumulated in memory operations buffer 210, when a request to perform memory operations accumulated in memory operations buffer 210 is received, and the like. In some embodiments, nodes have a predefined maximum size, and internal nodes have both a predefined minimum and a predefined maximum number of child nodes.

In some embodiments, when the one or more conditions are satisfied, management module 140 determines a number of split operations to perform based on the number of insert operations included in memory operations buffer 210, the maximum size of the leaf node, and the current number of keys associated with the leaf node. For example, leaf node 536 has a predetermined maximum size that enables it to hold data associated with up to eight keys. Thus, no split operation of leaf node 536 is required because leaf node 536 currently holds data associated with six keys and memory operations buffer 210 includes two insert operations (e.g., the first set of pending memory operations 504).

In FIG. 5, state 514 shows the status of TDS 530 after management module 140 performs the memory operations included in memory operations buffer 210 (e.g., the first set of pending memory operations 504). Management module 140 inserts data associated with keys 12 and 17 into leaf node 536. In state 514, leaf node 536 includes data with keys 8, 9, 11, 12, 17, 18, 19, and 31.

Figure 6A:
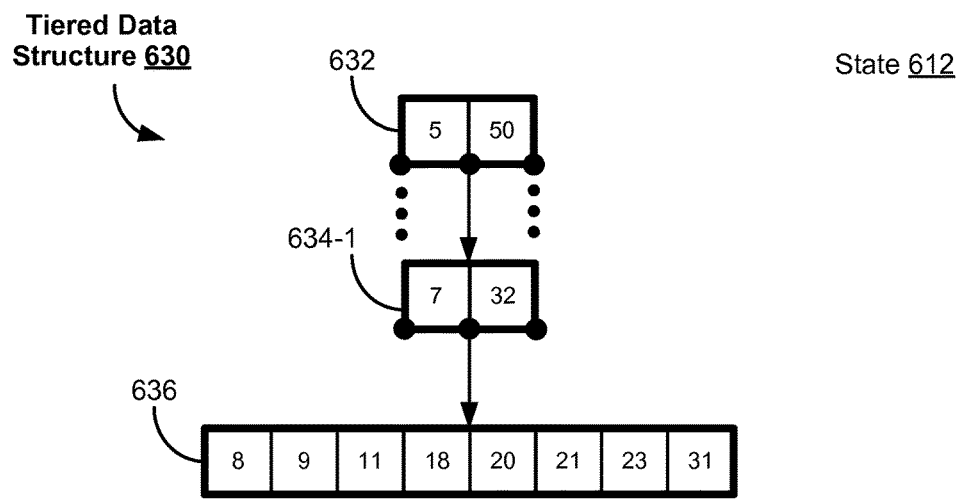
FIGS. 6A-6B illustrates performance of a second prophetic set of batched insert operations in the data storage system in accordance with some embodiments.
Figure 6B:
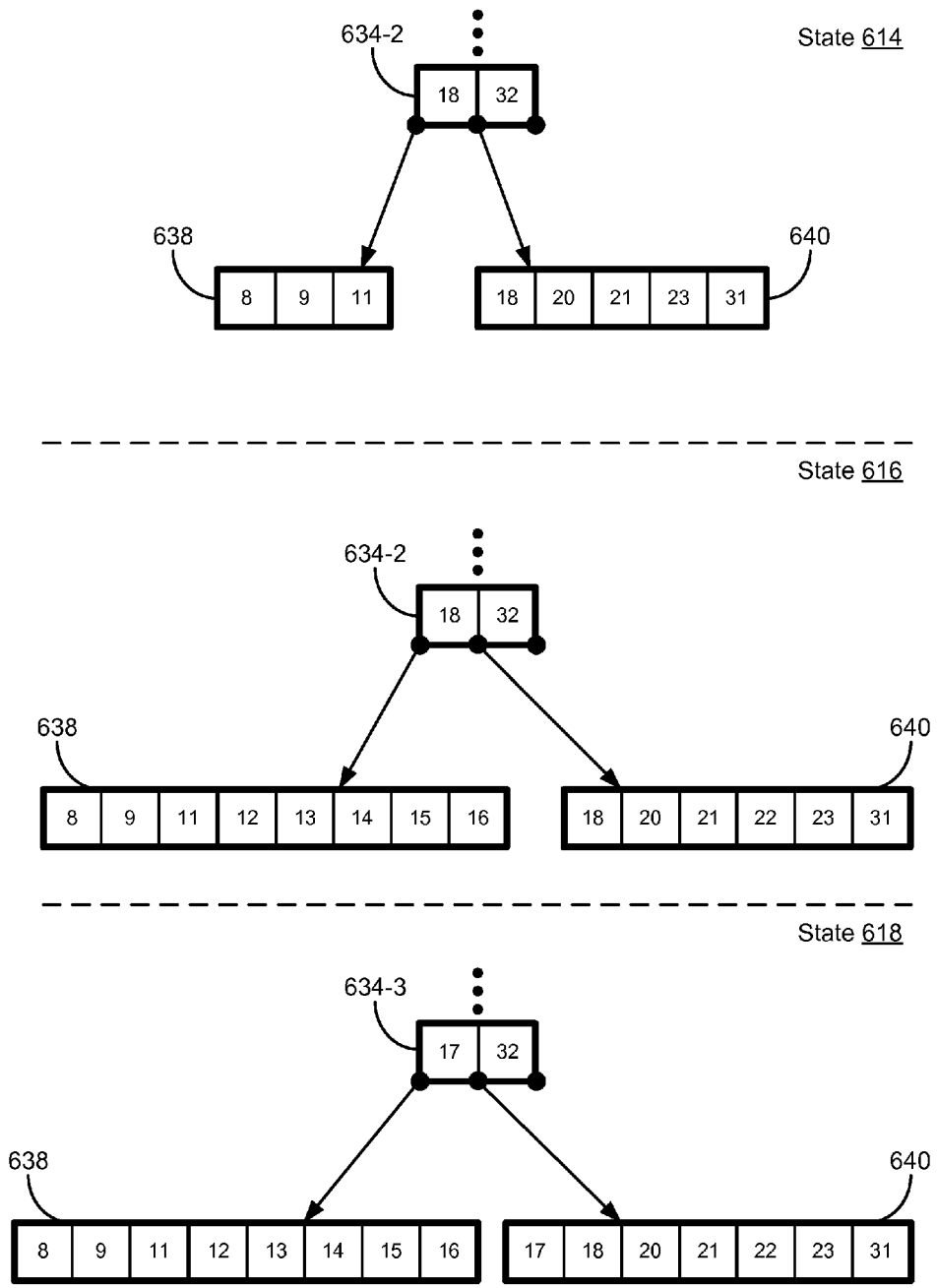

FIGS. 6A-6B illustrate the performance of a second prophetic set of insert operations on tiered data structure ("TDS") 630 in accordance with some embodiments. In FIG. 6A, state 612 shows the status of memory operations buffer 210 and TDS 630 prior to management module 140 performing the memory operations included in memory operations buffer 210 on TDS 630. In state 612, root node 632 indicates that internal node 634 is associated with data with keys between 5 and 49. In state 612, internal node 634-1 indicates that leaf node 636 is associated with data with keys between 7 and 31. In state 612, leaf node 636 includes data with keys 8, 9, 11, 18, 20, 21, 23, and 31. In state 612, memory operations buffer 210 includes a second prophetic set of pending memory operations 604, including insert operations of data with keys 12, 13, 14, 15, 16, and 17.

In some embodiments, management module 140 performs pending memory operations 604 on TDS 630 in accordance with a determination that one or more conditions are satisfied. For example, a respective condition of the one or more conditions are satisfied when a predetermined time period has expired, when a predetermined number of memory operations have accumulated in memory operations buffer 210, when a predetermined number of a predefined type of memory operations have accumulated in memory operations buffer 210, when a request to perform memory operations accumulated in memory operations buffer 210 is received, and the like. In some embodiments, nodes have a predefined maximum size, and internal nodes have both a predefined minimum and a predefined maximum number of child nodes.

In some embodiments, when the one or more conditions are satisfied, management module 140 determines the number of split operations to perform based on the number of insert operations included in memory operations buffer 210, the maximum size of the leaf node, and the current number of keys associated with the leaf node. For example, leaf node 636 has a predetermined maximum size that enables it to hold data associated with up to eight keys. Thus, a single split operation of leaf node 636 (e.g., resulting in two leaf nodes) is required because leaf node 636 currently holds data associated with eight keys and memory operations buffer 210 includes six insert operations (e.g., the second set of pending memory operations 604).

In FIG. 6B, state 614 shows the status of TDS 630 after management module 140 splits leaf node 636 into leaf nodes 638 and 640. In this example, management module 140 splits leaf node 636 between keys 11 and 18 because the memory operations included in memory operations buffer 210 are associated with data with keys between 11 and 18 (e.g., keys 12, 13, 14, 15, 16, and 17). In state 614, internal node 634-2 indicates that leaf node 638 is associated with data with keys between 5 and 17 and that leaf node 640 is associated with data with keys between 18 and 31.

In FIG. 6B, state 616 shows the status of TDS 630 after management module 140 inserts data associated with keys 12, 13, 14, 15, and 16 into leaf node 638. In this example, management module 140 inserts data associated with keys 12, 13, 14, 15, and 16 so as to fill leaf node 638 to its predetermined maximum. In state 616, leaf node 638 includes data with keys 8, 9, 11, 12, 13, 14, 15, and 16.

In FIG. 6B, state 618 shows the status of TDS 630 after management module 140 inserts data associated with key 17 into leaf node 640. In state 618, internal node 634-3 indicates that leaf node 638 is associated with data with keys between 5 and 16 and that leaf node 640 is associated with data with keys between 17 and 31. In state 618, leaf node 640 includes data with keys 17, 18, 19, 20, 21, 23, and 31.

Figure 7A:
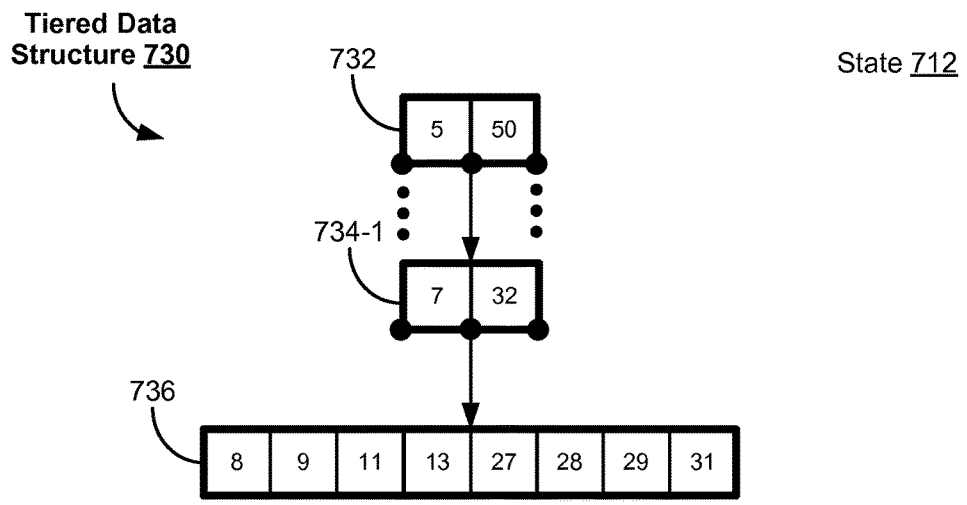
FIGS. 7A-7C illustrates performance of a third prophetic set of batched insert operations in the data storage system in accordance with some embodiments.
Figure 7B:
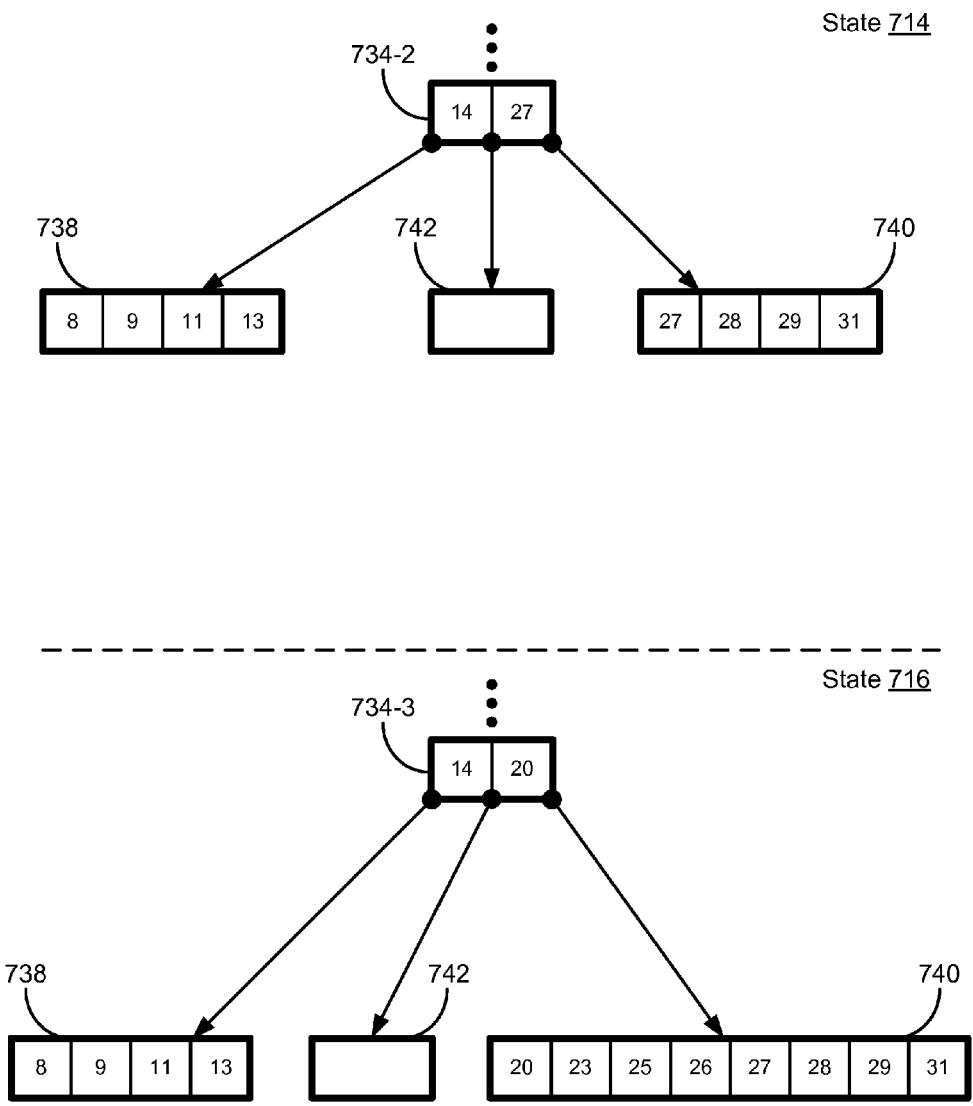
Figure 7C:
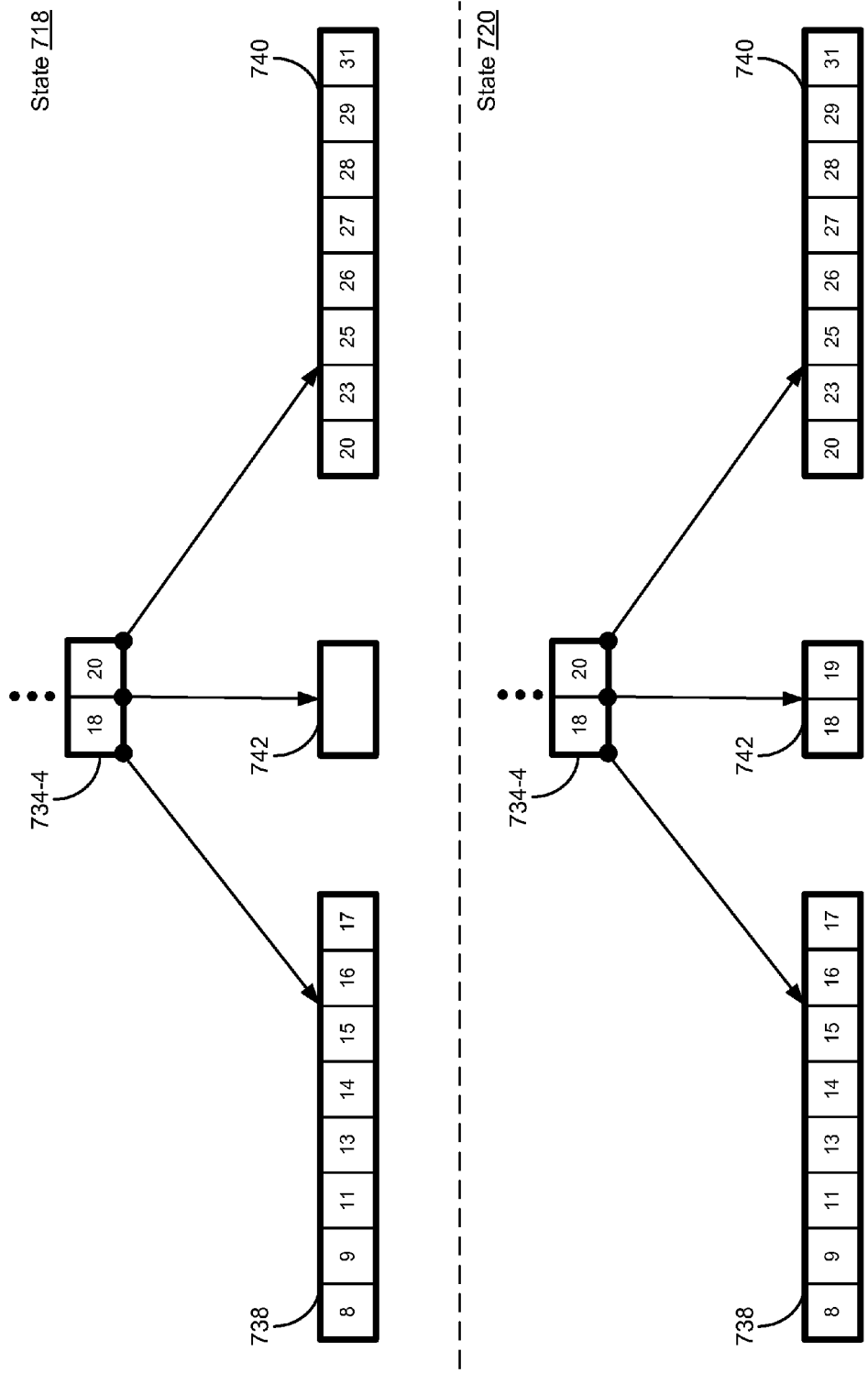

FIGS. 7A-7C illustrate the performance of a third prophetic set of insert operations on tiered data structure ("TDS") 730 in accordance with some embodiments. In FIG. 7A, state 712 shows the status of memory operations buffer 210 and TDS 730 prior to management module 140 performing the memory operations included in memory operations buffer 210 on TDS 730. In state 712, root node 732 indicates that internal node 734-1 is associated with data with keys between 5 and 49. In state 712, internal node 734-1 indicates that leaf node 736 is associated with data with keys between 7 and 31. In state 712, leaf node 736 includes data with keys 8, 9, 11, 13, 27, 28, 29, and 31. In state 712, memory operations buffer 210 includes a third prophetic set of pending memory operations 704, including insert operations of data with keys 14, 15, 16, 17, 18, 19, 20, 23, 25, and 26.

In some embodiments, management module 140 performs pending memory operations 704 on TDS 730 in accordance with a determination that one or more conditions are satisfied. For example, a respective condition of the one or more conditions are satisfied when a predetermined time period has expired, when a predetermined number of memory operations have accumulated in memory operations buffer 210, when a predetermined number of a predefined type of memory operations have accumulated in memory operations buffer 210, when a request to perform memory operations accumulated in memory operations buffer 210 is received, and the like. In some embodiments, nodes have a predefined maximum size, and internal nodes have both a predefined minimum and a predefined maximum number of child nodes.

In some embodiments, when the one or more conditions are satisfied, management module 140 determines the number of split operations to perform based on the number of insert operations included in memory operations buffer 210, the maximum size of the leaf node, and the current number of keys associated with the leaf node. For example, leaf node 736 has a predetermined maximum size that enables it to hold data associated with up to eight keys. Thus, two split operation of leaf node 736 (e.g., resulting in three leaf nodes) are required because leaf node 736 currently holds data associated with eight keys and memory operations buffer 210 includes ten insert operations (e.g., the third set of pending memory operations 704).

In FIG. 7B, state 714 shows the status of TDS 730 after management module 140 splits leaf node 736 into leaf nodes 738, 740, and 742. In this example, management module 140 splits leaf node 736 between keys 13 and 27 because the memory operations included in memory operations buffer 210 are associated with data with keys between 13 and 27 and adds leaf node 742. In state 714, internal node 734-2 indicates that leaf node 738 is associated with data with keys between 5 and 13, leaf node 742 is associated with data keys between 14 and 26, and leaf node 740 is associated with data with keys between 27 and 31.

In FIG. 7B, state 716 shows the status of TDS 730 after management module 140 inserts data associated with keys 20, 23, 25, and 26 into leaf node 740. In this example, management module 140 inserts data associated with keys 20, 23, 25, and 26 so as to fill leaf node 740 to its predetermined maximum. In state 716, leaf node 740 includes data with keys 20, 23, 25, 26, 27, 28, 29, and 31. In state 716, internal node 734-3 indicates that leaf node 738 is associated with data with keys between 5 and 13, leaf node 742 is associated with data keys between 14 and 19, and leaf node 740 is associated with data with keys between 20 and 31.

In FIG. 7C, state 718 shows the status of TDS 730 after management module 140 inserts data associated with keys 14, 15, 16, and 17 into leaf node 738. In this example, management module 140 inserts data associated with keys 14, 15, 16, and 17 so as to fill leaf node 738 to its predetermined maximum. In state 718, leaf node 738 includes data with keys 8, 9, 11, 13, 14, 15, 16, and 17. In state 718, internal node 734-4 indicates that leaf node 738 is associated with data with keys between 5 and 17, leaf node 742 is associated with data keys between 18 and 19, and leaf node 740 is associated with data with keys between 20 and 31.

In FIG. 7C, state 720 shows the status of TDS 630 after management module 140 inserts data associated with keys 18 and 19 into leaf node 742. In state 720, leaf node 742 includes data with keys 19 and 20.

Figure 8A:
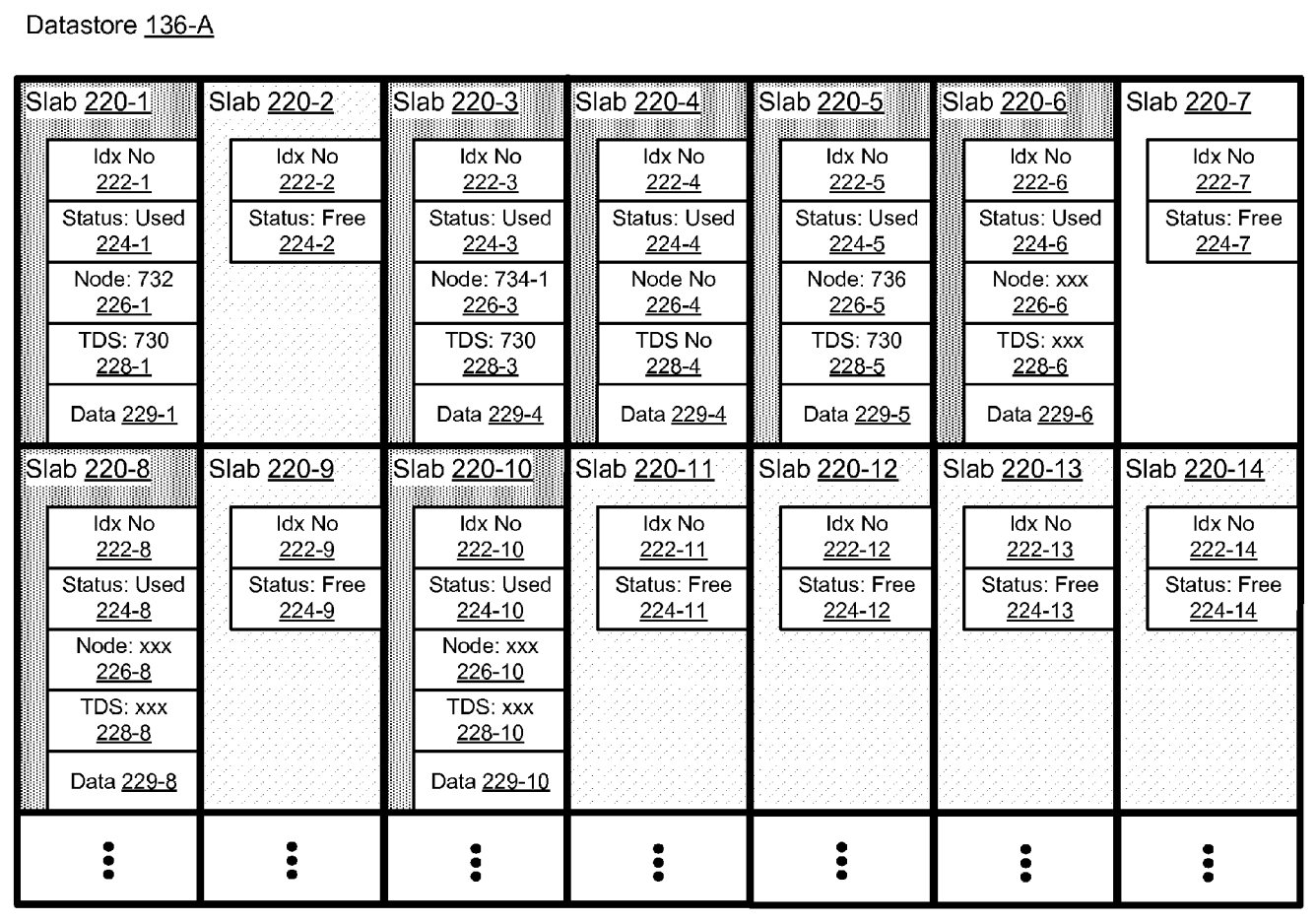

FIGS. 8A-8B illustrate example states of datastore 136 before and after performing the third set of insert operations 704 on tiered data structure ("TDS") 730 in FIGS. 7A-7C in accordance with some embodiments.

FIG. 8A shows datastore 136-A prior to performing the third set of insert operations 704 in memory operations buffer 210 shown in state 712 of FIG. 7A. Datastore 136-A includes root node 732 stored in slab 220-1, internal node 734-1 stored in slab 220-3, and leaf node 736 stored in slab 220-5. In FIG. 8A, datastore 136-A includes free slabs 220-2, 220-7, 220-9, 220-11, 220-12, 220-13, and 220-14.

FIG. 8B shows datastore 136-B after writing the modified nodes shown in state 720 of FIG. 7C to contiguous free slabs 220-11, 220-12, 220-13, and 220-14. In some embodiments, after determining an optimized node configuration for the third set of batched insert operations as shown in state 720 of FIG. 7C, management module 140 allocates a set of contiguous slabs in datastore 136 (e.g., free slabs 220-11, 220-12, 220-13, and 220-13) for the modified nodes shown in state 720 (e.g., internal node 734-4 and leaf nodes 738, 740, and 742). Subsequently, management module 140 writes the modified nodes shown in state 720 to the allocated contiguous set of slabs in datastore 136 so as to write the modified nodes in a single write operation. In FIG. 8B, internal node 734-4 is stored in slab 220-11, leaf node 738 is stored in slab 220-12, leaf node 740 is stored in slab 220-13, and leaf node 742 is stored in slab 220-14.

Attention is now directed to FIGS. 9A-9D, which illustrate a method 900 of improving input/output operation efficiency in a data storage system in accordance with some embodiments. Method 900 is, optionally, governed by instructions that are stored in a non-transitory computer readable storage medium and that are executed by one or more processors of a memory controller (e.g., management module 140, FIGS. 1 and 3). Each of the operations shown in FIGS. 9A-9D typically corresponds to instructions stored in a computer memory or non-transitory computer readable storage medium (e.g., memory 302 of management module 140 in FIG. 3). The computer readable storage medium optionally (and typically) includes a magnetic or optical disk storage device, solid state storage devices such as flash memory, 3D memory (as further described herein), or other non-volatile memory device or devices. The computer readable instructions stored on the computer readable storage medium typically include one or more of: source code, assembly language code, object code, or other instruction format that is interpreted or executed by one or more processors. In various embodiments, some operations in method 900 are combined and/or the order of some operations is changed from the order shown in FIGS. 9A-9D.

In some embodiments, method 900 is performed in a data storage system (e.g., data storage system 100, FIG. 1) that includes: (A) a memory controller (e.g., management module 140, FIGS. 1 and 3) with one or more processors (e.g., CPU(s) 142, FIGS. 1 and 3) and associated memory (e.g., memory 302, FIG. 3); (B) a non-volatile memory with a datastore (e.g., datastore 136, FIG. 2B) storing one or more tiered data structures; and (C) a volatile memory with a cache (e.g., cache 206, FIG. 2A) and a key-map (e.g., non-persistent key-map 202, FIG. 2A) storing datastore location information for a plurality of keys corresponding to data objects in the one or more tiered data structures stored in the datastore. In some embodiments, the non-volatile memory ("NVM") comprises one or more NVM devices such as magnetic disk storage device(s), optical disk storage device(s), flash memory device(s), 3D memory device(s), or other NVM memory device(s). In some embodiments, the volatile memory comprises one or more volatile memory devices such as DRAM, SRAM, DDR RAM, or other random access solid state memory device(s). In some embodiments, the memory controller is operatively coupled with or, alternatively, includes the non-volatile memory and/or the volatile memory.

The memory controller receives (902) one or more requests to perform transactions that include a plurality of memory operations to be performed on the datastore. For example, management module 140 receives a request from a requestor (e.g., computer system 110, FIG. 1) to perform a transaction including one or more memory operations to be performed on datastore 136. For example, the one or more memory operations associated with the requested transaction include insert, delete, and/or replace memory operations. In some embodiments, management module 140 creates an entry in memory operations buffer 210 for each of the one or more memory operations in the requested transaction. For example, a respective entry in memory operations buffer 210, corresponding to a respective memory operation in the requested transaction, includes a memory operation type (e.g., replace/update, delete, or insert/create), key information corresponding to a data object subject to the respective memory operation, and, in some circumstances, a value for the data object subject to the respective memory operation.

The memory controller batches (904), into a set of leaf node operations, memory operations of the plurality of memory operations (e.g., insert and update operations) that are associated with keys in a range of keys, where a respective leaf node (sometimes called a first leaf node) in a tiered data structure of the one or more tiered data structures stored in the datastore is assigned the range of keys. In some embodiments, management module 140 or a component thereof (e.g., pre-processing module 348, FIG. 3) batches two or more insert operations corresponding to keys in a range of keys that are associated with a same leaf node into a set of leaf node operations. With reference to state 612 in FIG. 6A, management module 140 batches insert operations 604 in memory operations buffer 210 that are associated with keys (e.g., keys 8, 9, 11, 18, 20, 21, 23, and 31) in a range of keys associated with leaf node 636 (e.g., keys 7-31) of TDS 630 into the set of leaf node operations.

The memory controller determines (906) whether one or more predefined conditions are satisfied. In some embodiments, management module 140 performs pending memory operations in memory operations buffer 210 on a TDS stored in datastore 136 in accordance with a determination that one or more conditions are satisfied. For example, a respective condition of the one or more conditions are satisfied when a predetermined time period has expired, when a predetermined number of memory operations have accumulated in memory operations buffer 210, when a predetermined number of a predefined type of memory operations have accumulated in memory operations buffer 210, when a request to perform memory operations accumulated in memory operations buffer 210 is received, and the like.

In accordance with a determination that the one or more conditions are satisfied, the memory controller locates (908) the respective leaf node in the tiered data structure using the key-map to map one of the keys associated with one of the memory operations in the set of leaf node operations to a location (e.g., a slab) in the datastore that includes the respective leaf node. In some embodiments, management module 140 locates a leaf node assigned to a range of keys that includes the keys associated with the set of leaf node operations by mapping one of the key associated with one of the set of leaf node operations to location information in non-persistent key-map 202. In some embodiments, the location information is the location of the leaf node assigned to the range of keys that includes the keys associated with the set of leaf node operations, a pointer to the location in datastore 136 of the leaf node assigned to the range of keys that includes the keys associated with the set of leaf node operations, or the location of a slab in datastore 136 storing the leaf node assigned to the range of keys that includes the keys associated with the set of leaf node operations. For example, with reference to state 712 in FIG. 7A, management module 140 maps key 17 associated with one of the set of pending memory operations 704 to leaf node 736 of TDS 730, which is associated with keys 7-31.

The memory controller stores (910) a copy of the respective leaf node in the cache. Continuing with the example in step 908, after locating leaf node 736, memory module 140 stores leaf node 736 or a copy thereof in cache 206.

The memory controller modifies (912) the copy of the respective leaf node according to the set of leaf node operations so as to obtain one or more modified leaf nodes. In some embodiments, memory module 140 or a component thereof (e.g., pre-processing module 348, FIG. 3) performs the set of leaf node operations (e.g., including one or more the insert operations) by determining an optimized node configuration based on the set of leaf node operations so as to optimally fill the cached leaf node or copy thereof. As such, the number of input/output operation per second (IOPS) required to perform the set of leaf node operations is reduced to a minimum.

In some embodiments, modifying the copy of the respective leaf node comprises determining (914) whether a set of insert operations in the set of leaf node operations requires a split operation of the copy of the respective leaf node (in the cache) into two or more leaf nodes. In some embodiments, memory module 140 or a component thereof (e.g., pre-processing module 348, FIG. 3) determines the number of split operations to perform on the cached node or copy thereof based on the number of insert operations included in the set of leaf node operations, the maximum size of the cached leaf node or copy thereof, and the current number of keys associated with the cached leaf node or copy thereof.

In some embodiments, in accordance with a determination that the set of insert operations in the set of leaf node operations does not require a split of the copy of the respective leaf node, the memory controller processes (916) the set of insert operations in the set of leaf node operations by inserting one or more data objects corresponding to the set of insert operations into the copy of the respective leaf node, the set of insert operations includes one or more insert operations. For example, with reference to state 512 in FIG. 5, leaf node 536 of TDS 530 has a predetermined maximum size that enables it to hold data associated with up to eight keys. In this example, no split operation of leaf node 536 is required because leaf node 536 currently holds data associated with six keys and pending memory operations 504 (e.g., the set of leaf node operations) in memory operations buffer 210 includes two insert operations (e.g., associated with keys 12 and 17). State 514 in FIG. 5, for example shows the status of TDS 530 after management module 140 performs memory operations 504 by inserting data associated with keys 12 and 17 into leaf node 536.

In some embodiments, in accordance with a determination that the set of insert operations in the set of leaf node operations requires a split of the copy of the respective leaf node into two leaf nodes, the memory controller splits (918) the copy of the respective leaf node into the two leaf nodes, and the memory controller processes the set of one or more insert operations in the set of leaf node operations by: (A) inserting data objects associated with the set of insert operations into a first leaf node of the two leaf nodes; and (B) in accordance with a determination that the first leaf node is full, inserting data objects associated with remaining insert operations in the set of insert operations into a second leaf node of the two leaf nodes. In some embodiments, the split occurs at the insertion point associated with the set of insert operations in the set of leaf node operations. In some embodiments, data objects are first packed into the first leaf node, where the first leaf node is a left leaf node. In some embodiments, data objects are then packed into the second leaf node, where the second leaf node is a right leaf node.

For example, with reference to state 612 in FIG. 6A, leaf node 636 of TDS 630 has a predetermined maximum size that enables it to hold data associated with up to eight keys. In this example, a single split operation of leaf node 636 (e.g., resulting in two leaf nodes) is required because leaf node 636 currently holds data associated with eight keys and pending memory operations 604 (e.g., the set of leaf node operations) in memory operations buffer 210 includes six insert operations (e.g., associated with keys 12, 13, 14, 15, 16, and 17). State 614 in FIG. 6B, for example, shows the status of TDS 630 after management module 140 splits leaf node 636 into leaf nodes 638 and 640. State 616 in FIG. 6B, for example, shows the status of TDS 630 after management module 140 inserts data associated with keys 12, 13, 14, 15, and 16 into leaf node 638 (e.g., the leftmost leaf node) so as to fill leaf node 638 to its predetermined maximum. State 618 in FIG. 6B, for example, shows the status of TDS 630 after management module 140 inserts data associated with key 17 into leaf node 640 (e.g., the rightmost leaf node).

In some embodiments, in accordance with a determination that the set of insert operations in the set of leaf node operations requires a split of the copy of the respective leaf node into three or more leaf nodes, the memory controller splits (920) the copy of the respective leaf node into the three or more leaf nodes, and the memory controller processes the set of one or more insert operations in the set of leaf node operations by: (A) inserting data objects associated with a first subset of the set of insert operations into a first leaf node of the three or more leaf nodes; (B) in accordance with a first determination that the first leaf node of the three or more leaf nodes (the nodes produced by the split 920) is full, inserting data objects associated with a second subset of insert operations, distinct from the first subset of insert operations, into a second leaf node of the three or more leaf nodes; and (C) in accordance with a second determination that the second leaf node is full, inserting data objects associated with remaining insert operations in the set of insert operations, distinct from the insert operations in the first subset of insert operations and second subset of insert operations, into remaining leaf nodes of the three or more leaf nodes that are distinct from the first leaf node and the second leaf node. In some embodiments, data objects are first packed into the first leaf node, where the first leaf node is a right leaf node. In some embodiments, data objects are then packed into the second leaf node, where the second leaf node is a left leaf node.

For example, with reference to state 712 in FIG. 7A, leaf node 736 of TDS 730 has a predetermined maximum size that enables it to hold data associated with up to eight keys. In this example, two split operations of leaf node 736 (e.g., resulting in three leaf nodes) are required because leaf node 736 currently holds data associated with eight keys and pending memory operations 704 (e.g., the set of leaf node operations) in memory operations buffer 210 includes ten insert operations (e.g., associated with keys 14, 15, 16, 17, 18, 19, 20, 23, 25, and 26). State 714 in FIG. 7B, for example, shows the status of TDS 730 after management module 140 splits leaf node 736 into leaf nodes 738, 740, and 742. State 716 in FIG. 7B, for example, shows the status of TDS 730 after management module 140 inserts data associated with keys 20, 23, 25, and 26 into leaf node 740 (e.g., the rightmost leaf node) so as to fill leaf node 740 to its predetermined maximum. State 718 in FIG. 7C, for example, shows the status of TDS 730 after management module 140 inserts data associated with keys 14, 15, 16, and 17 into leaf node 738 (e.g., the leftmost leaf node) so as to fill leaf node 738 to its predetermined maximum. State 720 in FIG. 7C, for example, shows the status of TDS 630 after management module 140 inserts data associated with keys 18 and 19 into leaf node 742 (e.g., the added leaf node).

In some embodiments, in accordance with a determination that the writing comprises writing a plurality of leaf nodes and prior to writing the one or more modified leaf nodes, the memory controller (922): allocates two or more contiguous slabs in the datastore for the plurality of leaf nodes; and assigns keys in the key-map for data objects corresponding to the memory operations in the set of leaf node operations to locations of the two or more contiguous slabs. In some embodiments, the datastore comprises a plurality of slabs, and the tiered data structure of the one or more tiered data structures includes a plurality of leaf nodes, where the respective leaf node of the tiered data structure includes one or more data objects and is stored in a respective slab of the plurality of slabs. In some embodiments, management module 140 or a component thereof (e.g., allocation module 344, FIG. 3) allocates two or more contiguous slabs 220 in datastore 136 for the two or more modified leaf nodes. For example, after determining an optimized node configuration for the third set of batched insert operations as shown in state 720 of FIG. 7C, management module 140 allocates contiguous free slabs 220-11, 220-12, 220-13, and 220-13 of datastore 136-A shown in FIG. 8A for the modified nodes shown in state 720 (e.g., internal node 734-4 and leaf nodes 738, 740, and 742). In some embodiments, management module 140 or a component thereof (e.g., mapping module 345, FIG. 3) updates keys in non-persistent key-map 202 that correspond to data objects subject to the memory operations in the set of leaf node operations to the allocated contiguous free slabs.

In some embodiments, prior to writing the one or more modified leaf nodes to the one or more locations in the datastore, the memory controller assigns (924) the keys in the key-map, for data objects corresponding to the memory operations in the set of leaf node operations, to the one or more locations in the datastore. In some embodiments, management module 140 or a component thereof (e.g., mapping module 345, FIG. 3) updates keys in non-persistent key-map 202 that correspond to data objects subject to the memory operations in the set of leaf node operations to the one or more locations in datastore 136.

The memory controller writes (926) the one or more modified leaf nodes to one or more locations in the datastore with one or more write operations. For example, the one or more write operations are a minimum amount of write operations—typically a single write to one or more contiguous slabs in the datastore. In some embodiments, management module 140 or a component thereof writes the one or more modified leaf nodes to datastore 139 with a minimum number of write operations.

In some embodiments, writing the one or more modified leaf nodes to one or more locations in the datastore comprises (928) writing the plurality of leaf nodes to the two or more contiguous slabs in the datastore in a single write operation. In some embodiments, the allocated slabs are free or clean, where the allocated slabs do not currently store any data objects and are not associated with a leaf node in one of the tiered data structures. In some embodiments, writing to contiguous slabs enables management module 140 to write the one or more modified leaf node to datastore 136 with a single write operation. Continuing with the example in step 922, after allocating the contiguous free slabs in datastore 136 for the modified nodes shown in state 720, management module 140 writes the modified nodes shown in state 720 (e.g., internal node 734-4 and leaf nodes 738, 740, and 742) to allocated contiguous slabs 220-11, 220-12, 220-13, and 220-13 in datastore 136 with a single write operation. FIG. 8B, for example, shows datastore 136-B with internal node 734-4 stored in slab 220-11, leaf node 738 stored in slab 220-12, leaf node 740 stored in slab 220-13, and leaf node 742 stored in slab 220-14.

Figure 9A:
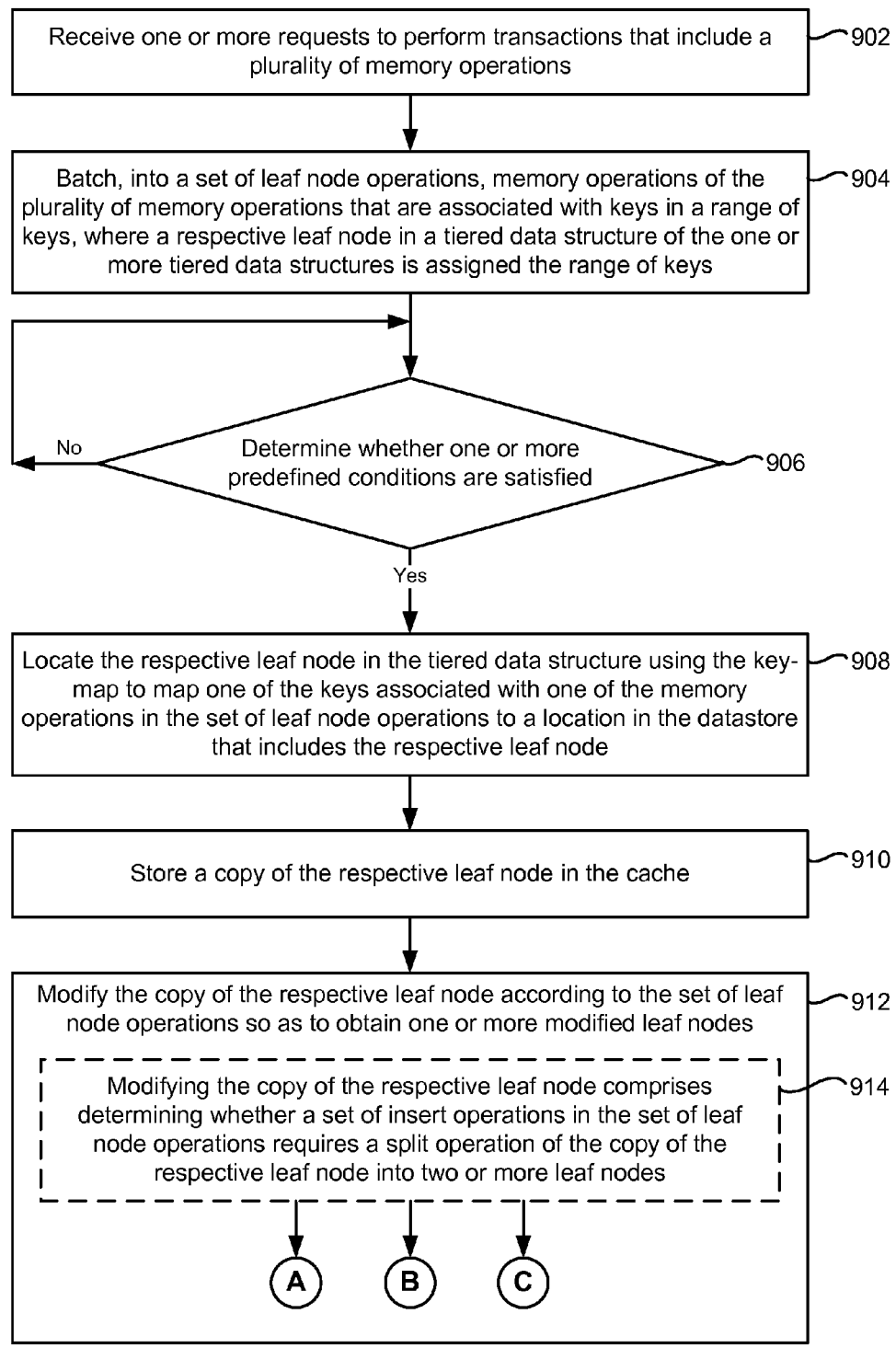
FIGS. 9A-9D illustrate a flowchart representation of a method of improving the input/output efficient of a data storage system in accordance with some embodiments.
Figure 9B:
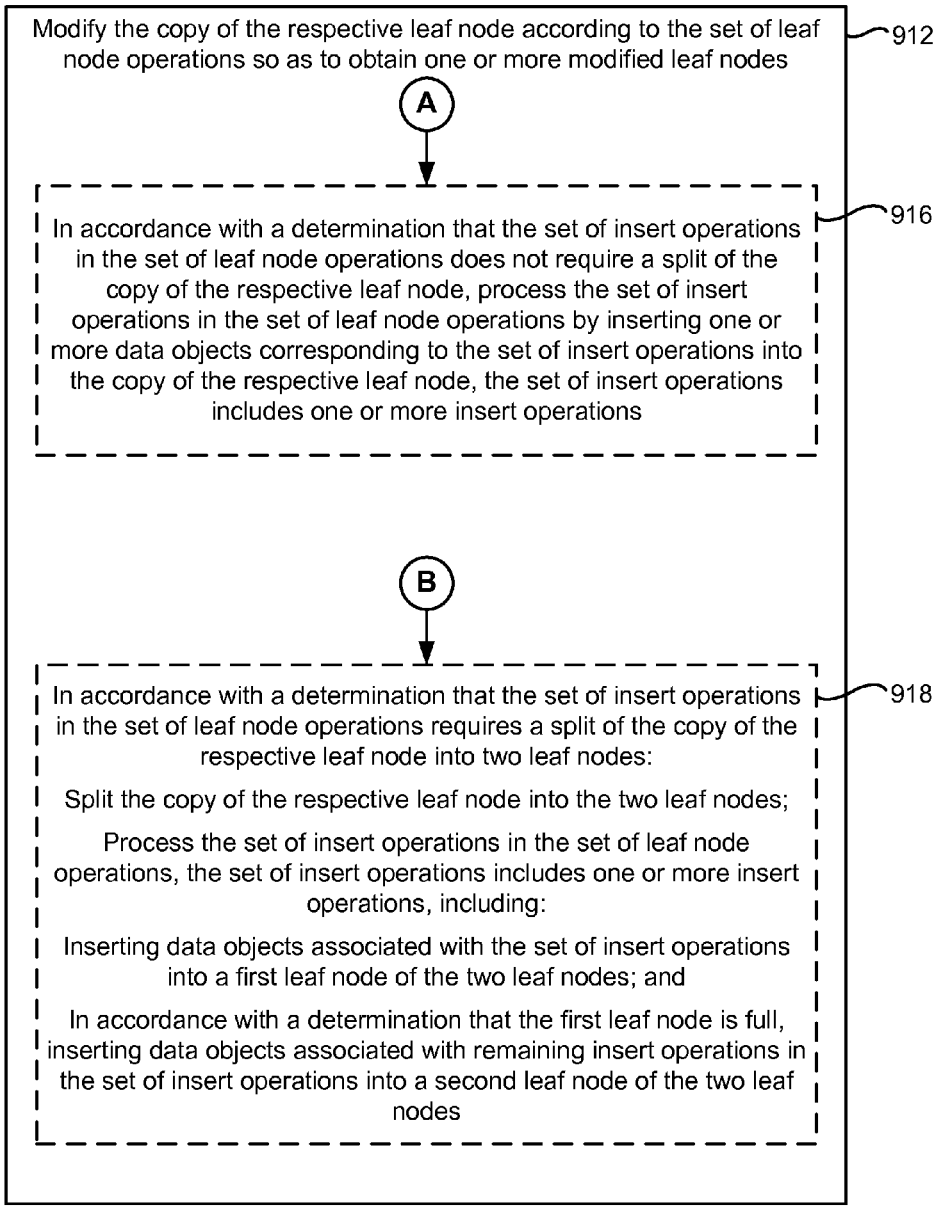
Figure 9C:
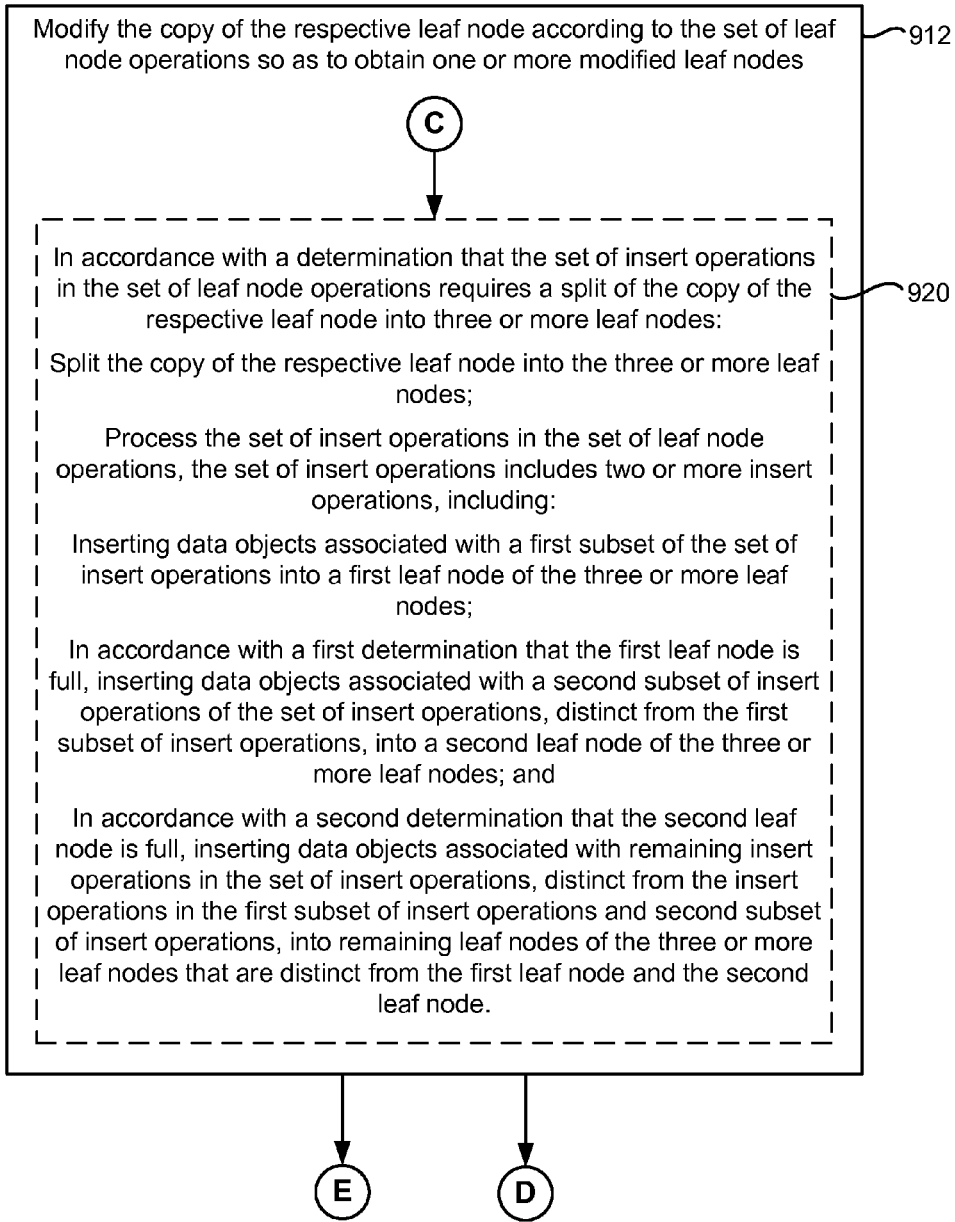
Figure 9D:
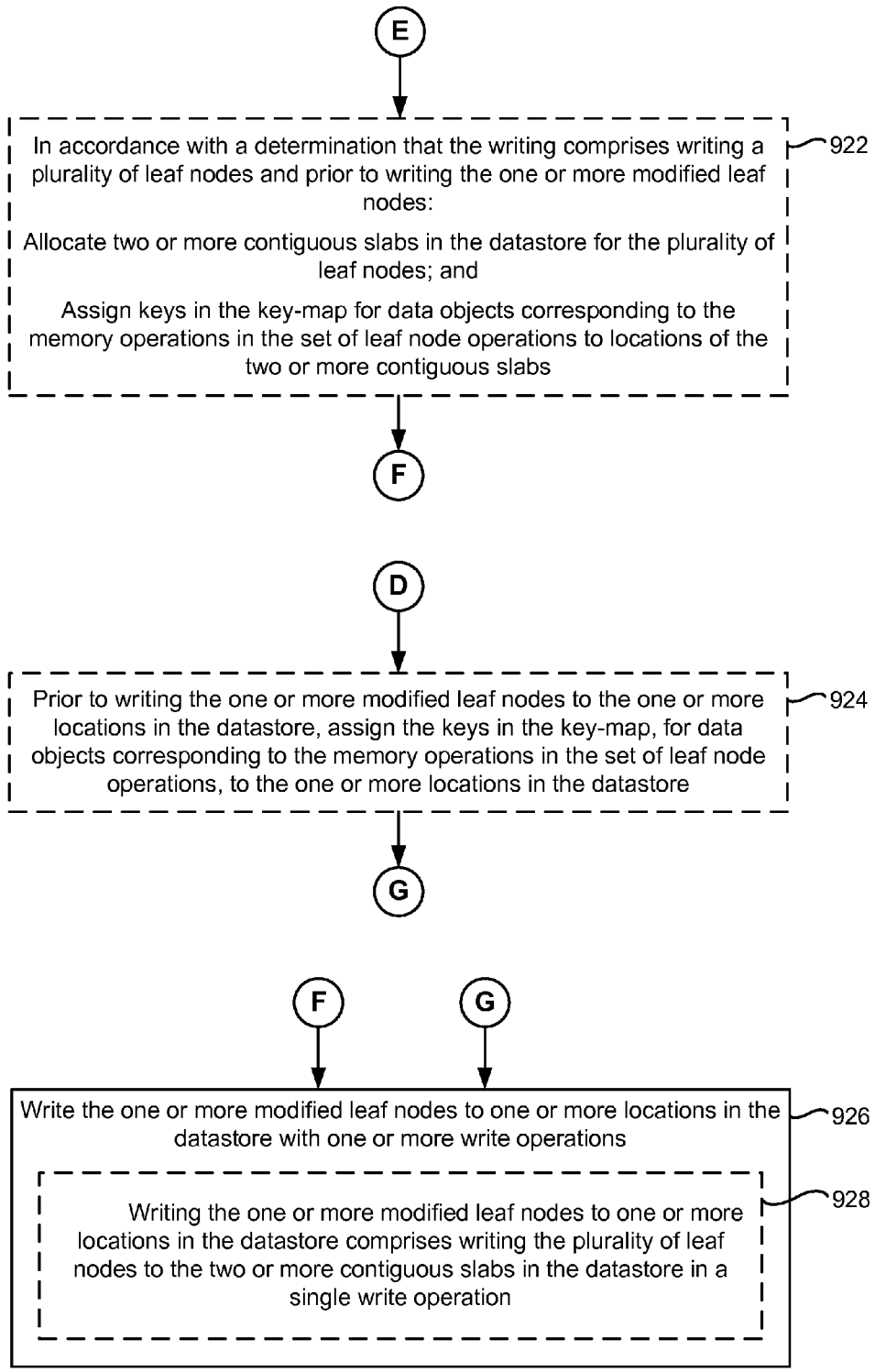

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein.

Semiconductor memory devices include: volatile memory devices such as dynamic random access memory ("DRAM") or static random access memory ("SRAM") devices; non-volatile memory devices such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"); and other semiconductor elements capable of storing information. Furthermore, each type of memory device may have different configurations. For example, flash memory devices may be configured in a NAND or a NOR configuration.

The memory devices can be formed from passive elements, active elements, or both. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible such as a NOR memory array. One of skill in the art will recognize that the NAND and NOR memory configurations are exemplary, and memory elements may be otherwise configured.

The semiconductor memory elements included in a single device, such as memory elements located within and/or over the same substrate (e.g., a silicon substrate) or in a single die, may be distributed in a two- or three-dimensional manner (such as a two dimensional ("2D") memory array structure or a three dimensional ("3D") memory array structure).

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer on which the material layers of the memory elements are deposited and/or in which memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, including a bit line and a word line.

A three dimensional memory array is organized so that memory elements occupy multiple planes or multiple device levels, forming a structure in three dimensions (i.e., in the x, y, and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked planes of memory devices. The columns may be arranged in a two dimensional configuration, such as in an x-z plane, thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single plane, sometimes called a horizontal (e.g., x-z) plane for ease of discussion. Alternatively, the memory elements may be connected together to extend through multiple parallel planes. Other three dimensional configurations can be envisioned where some NAND strings contain memory elements in a single plane of memory elements (sometimes called a memory level) while other strings contain memory elements which extend through multiple parallel planes (sometimes called parallel memory levels). Three dimensional memory arrays may also be designed in a NOR configuration and in a ReRAM configuration.

A monolithic three dimensional memory array is one in which multiple planes of memory elements (also called multiple memory levels) are formed above and/or within a single substrate, such as a semiconductor wafer, according to a sequence of manufacturing operations. In a monolithic 3D memory array, the material layers forming a respective memory level, such as the topmost memory level, are located on top of the material layers forming an underlying memory level, but on the same single substrate. In some implementations, adjacent memory levels of a monolithic 3D memory array optionally share at least one material layer, while in other implementations adjacent memory levels have intervening material layers separating them.

In contrast, two dimensional memory arrays may be formed separately and then integrated together to form a non-monolithic 3D memory device in a hybrid manner. For example, stacked memories have been constructed by forming 2D memory levels on separate substrates and integrating the formed 2D memory levels atop each other. The substrate of each 2D memory level may be thinned or removed prior to integrating it into a 3D memory device. As the individual memory levels are formed on separate substrates, the resulting 3D memory arrays are not monolithic three dimensional memory arrays.

Associated circuitry is typically required for proper operation of the memory elements and for proper communication with the memory elements. This associated circuitry may be on the same substrate as the memory array and/or on a separate substrate. As non-limiting examples, the memory devices may have driver circuitry and control circuitry used in the programming and reading of the memory elements.

Further, more than one memory array selected from 2D memory arrays and 3D memory arrays (monolithic or hybrid) may be formed separately and then packaged together to form a stacked-chip memory device. A stacked-chip memory device includes multiple planes or layers of memory devices, sometimes called memory levels.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

A person skilled in the art will recognize that the invention or inventions descried and claimed herein are not limited to the two dimensional and three dimensional exemplary structures described here, and instead cover all relevant memory structures suitable for implementing the invention or inventions as described herein and as understood by one skilled in the art.

It will be understood that, although the terms "first," "second," etc. may be used herein to describe various elements, these elements should not be limited by these terms. These terms are only used to distinguish one element from another. For example, a first data object could be termed a second data object, and, similarly, a second data object could be termed a first data object, which changing the meaning of the description, so long as all occurrences of the "first data object" are renamed consistently and all occurrences of the "second data object" are renamed consistently. The first data object and the second data object are both data objects, but they are not the same data object.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of improving input/output operation efficiency in a data storage system that includes: a memory controller with one or more processors; a datastore storing one or more tiered data structures; and a volatile memory distinct from the datastore, the volatile memory including a cache and a key-map that is distinct from the one or more tiered data structures stored in the datastore; the method comprising:
   at the memory controller operatively coupled with the datastore and the volatile memory:
      receiving one or more requests to perform transactions that include a plurality of memory operations to be performed on the datastore;
      batching, into a batched set of leaf node operations, memory operations of the plurality of memory operations that are associated with keys in a range of keys assigned to a first leaf node in a tiered data structure of the one or more tiered data structures;
      determining whether one or more predefined conditions are satisfied; and
      in accordance with a determination that the one or more conditions are satisfied:
         locating the first leaf node in the tiered data structure using the key-map to map one of the keys associated with one of the memory operations in the batched set of leaf node operations to a location in the datastore that includes the first leaf node;
         storing a copy of the first leaf node in the cache;
         modifying the copy of the first leaf node by performing the batched set of leaf node operations so as to obtain one or more modified leaf nodes, wherein modifying the copy of the first leaf node comprises determining whether a set of insert operations in the batched set of leaf node operations requires a split of the copy of the first leaf node into two or more leaf nodes; and
         writing the one or more modified leaf nodes to one or more locations in the datastore with one or more write operations.

2. The method of claim 1, wherein:
   the datastore comprises a plurality of slabs;
   the tiered data structure of the one or more tiered data structures includes a plurality of leaf nodes;
   the first leaf node of the tiered data structure includes one or more data objects and is stored in a first slab of the plurality of slabs;
   the method further comprises:
      in accordance with a determination that the writing comprises writing a plurality of leaf nodes, prior to writing the one or more modified leaf nodes:
         allocating two or more contiguous slabs in the datastore for the plurality of leaf nodes; and
         assigning keys in the key-map for data objects corresponding to the memory operations in the batched set of leaf node operations to locations of the two or more contiguous slabs; and
      writing the one or more modified leaf nodes to one or more locations in the datastore comprises writing the plurality of leaf nodes to the two or more contiguous slabs in the datastore in a single write operation.

3. The method of claim 1, further comprising:
prior to writing the one or more modified leaf nodes to the one or more locations in the datastore, assigning the keys in the key-map, for data objects corresponding to the memory operations in the batched set of leaf node operations, to the one or more locations in the datastore.

4. The method of claim 1, further comprising:
in accordance with a determination that the set of insert operations in the batched set of leaf node operations does not require a split of the copy of the first leaf node, processing the set of insert operations in the batched set of leaf node operations by inserting one or more data objects corresponding to the set of insert operations into the copy of the first leaf node, the set of insert operations including one or more insert operations.

5. The method of claim 1, further comprising:
in accordance with a determination that the set of insert operations in the batched set of leaf node operations requires a split of the copy of the first leaf node into two leaf nodes:
   splitting the copy of the first leaf node into the two leaf nodes; and
   processing the set of insert operations in the batched set of leaf node operations, the set of insert operations including one or more insert operations, the processing including:
      inserting data objects associated with the set of insert operations into a particular leaf node of the two leaf nodes; and
      in accordance with a determination that the particular leaf node is full, inserting data objects associated with remaining insert operations in the set of insert operations into a second leaf node of the two leaf nodes.

6. The method of claim 1, further comprising:
in accordance with a determination that the set of insert operations in the batched set of leaf node operations requires a split of the copy of the first leaf node into three or more leaf nodes:
   splitting the copy of the first leaf node into the three or more leaf nodes; and
   processing the set of insert operations in the batched set of leaf node operations, the set of insert operations including two or more insert operations, the processing including:
      inserting data objects associated with a first subset of the set of insert operations into a first leaf node of the three or more leaf nodes;
      in accordance with a first determination that the first leaf node of the three or more leaf nodes is full, inserting data objects associated with a second subset of insert operations of the set of insert operations, distinct from the first subset of insert operations, into a second leaf node of the three or more leaf nodes; and
      in accordance with a second determination that the second leaf node is full, inserting data objects associated with remaining insert operations in the set of insert operations, distinct from the insert operations in the first subset of insert operations and the second subset of insert operations, into remaining leaf nodes of the three or more leaf nodes that are distinct from the first leaf node and the second leaf node.

7. A data storage system, comprising:
a datastore storing one or more tiered data structures;
a volatile memory distinct from the datastore, the volatile memory including a cache and a key-map that is distinct from the one or more tiered data structures stored in the datastore; and
a memory controller with one or more processors and memory storing one or more programs, wherein the one or more programs are configured to be executed by the one or more processors, the one or more programs including instructions for:
   receiving one or more requests to perform transactions that include a plurality of memory operations to be performed on the datastore;
   batching, into a batched set of leaf node operations, memory operations of the plurality of memory operations that are associated with keys in a range of keys assigned to a first leaf node in a tiered data structure of the one or more tiered data structures;
   determining whether one or more predefined conditions are satisfied; and
   in accordance with a determination that the one or more conditions are satisfied:
      locating the first leaf node in the tiered data structure using the key-map to map one of the keys associated with one of the memory operations in the batched set of leaf node operations to a location in the datastore that includes the first leaf node;
      storing a copy of the first leaf node in the cache;
      modifying the copy of the first leaf node by performing the batched set of leaf node operations so as to obtain one or more modified leaf nodes, wherein modifying the copy of the first leaf node comprises determining whether a set of insert operations in the batched set of leaf node operations requires a split of the copy of the first leaf node into two or more leaf nodes; and
      writing the one or more modified leaf nodes to one or more locations in the datastore with one or more write operations.

8. The data storage system of claim 7, wherein:
the datastore comprises a plurality of slabs;
the tiered data structure of the one or more tiered data structures includes a plurality of leaf nodes;
the first leaf node of the tiered data structure includes one or more data objects and is stored in a first slab of the plurality of slabs;
the one or more programs further include instructions for:
   in accordance with a determination that the writing comprises writing a plurality of leaf nodes, prior to writing the one or more modified leaf nodes:
      allocating two or more contiguous slabs in the datastore for the plurality of leaf nodes; and
      assigning keys in the key-map for data objects corresponding to the memory operations in the batched set of leaf node operations to locations of the two or more contiguous slabs; and
writing the one or more modified leaf nodes to one or more locations in the datastore comprises writing the plurality of leaf nodes to the two or more contiguous slabs in the datastore in a single write operation.

9. The data storage system of claim 7, the one or more programs further including instructions for:
prior to writing the one or more modified leaf nodes to the one or more locations in the datastore, assigning the keys in the key-map, for data objects corresponding to the memory operations in the batched set of leaf node operations, to the one or more locations in the datastore.

10. The data storage system of claim 7, the one or more programs further including instructions for:
in accordance with a determination that the set of insert operations in the batched set of leaf node operations does not require a split of the copy of the first leaf node, processing the set of insert operations in the batched set of leaf node operations by inserting one or more data objects corresponding to the set of insert operations into the copy of the first leaf node, the set of insert operations including one or more insert operations.

11. The data storage system of claim 7, the one or more programs further including instructions for:
in accordance with a determination that the set of insert operations in the batched set of leaf node operations requires a split of the copy of the first leaf node into two leaf nodes:
splitting the copy of the first leaf node into the two leaf nodes; and
processing the set of insert operations in the batched set of leaf node operations, the set of insert operations including one or more insert operations, the processing including:
inserting data objects associated with the set of insert operations into a particular leaf node of the two leaf nodes; and
in accordance with a determination that the particular leaf node is full, inserting data objects associated with remaining insert operations in the set of insert operations into a second leaf node of the two leaf nodes.

12. The data storage system of claim 7, the one or more programs further including instructions for:
in accordance with a determination that the set of insert operations in the batched set of leaf node operations requires a split of the copy of the first leaf node into three or more leaf nodes:
splitting the copy of the first leaf node into the three or more leaf nodes; and
processing the set of insert operations in the batched set of leaf node operations, the set of insert operations including two or more insert operations, the processing including:
inserting data objects associated with a first subset of the set of insert operations into a first leaf node of the three or more leaf nodes;
in accordance with a first determination that the first leaf node of the three or more leaf nodes is full, inserting data objects associated with a second subset of insert operations of the set of insert operations, distinct from the first subset of insert operations, into a second leaf node of the three or more leaf nodes; and
in accordance with a second determination that the second leaf node is full, inserting data objects associated with remaining insert operations in the set of insert operations, distinct from the insert operations in the first subset of insert operations and the second subset of insert operations, into remaining leaf nodes of the three or more leaf nodes that are distinct from the first leaf node and the second leaf node.

13. A non-transitory computer-readable storage medium storing one or more programs, the one or more programs comprising instructions which, when executed by a memory controller with one or more processors, cause the memory controller to:
receive one or more requests to perform transactions that include a plurality of memory operations to be performed on a datastore storing one or more tiered data structures;
batch, into a batched set of leaf node operations, memory operations of the plurality of memory operations that are associated with keys in a range of keys assigned to a first leaf node in a tiered data structure of the one or more tiered data structures;
determine whether one or more predefined conditions are satisfied; and
in accordance with a determination that the one or more conditions are satisfied:
locate the first leaf node in the tiered data structure using a key-map to map one of the keys associated with one of the memory operations in the batched set of leaf node operations to a location in the datastore that includes the first leaf node;
store a copy of the first leaf node in the cache;
modify the copy of the first leaf node by performing the batched set of leaf node operations so as to obtain one or more modified leaf nodes, wherein modifying the copy of the first leaf node comprises determining whether a set of insert operations in the batched set of leaf node operations requires a split of the copy of the first leaf node into two or more leaf nodes; and
write the one or more modified leaf nodes to one or more locations in the datastore with one or more write operations.

14. The non-transitory computer-readable storage medium of claim 13, wherein:
the datastore comprises a plurality of slabs;
the tiered data structure of the one or more tiered data structures includes a plurality of leaf nodes;
the first leaf node of the tiered data structure includes one or more data objects and is stored in a first slab of the plurality of slabs;
the instructions further cause the memory controller to:
in accordance with a determination that the writing comprises writing a plurality of leaf nodes, prior to writing the one or more modified leaf nodes:
allocate two or more contiguous slabs in the datastore for the plurality of leaf nodes; and
assign keys in the key-map for data objects corresponding to the memory operations in the batched set of leaf node operations to locations of the two or more contiguous slabs; and
writing the one or more modified leaf nodes to one or more locations in the datastore comprises writing the plurality of leaf nodes to the two or more contiguous slabs in the datastore in a single write operation.

15. The non-transitory computer-readable storage medium of claim 13, wherein the instructions further cause the memory controller to:
prior to writing the one or more modified leaf nodes to the one or more locations in the datastore, assign the keys in the key-map, for data objects corresponding to the memory operations in the batched set of leaf node operations, to the one or more locations in the datastore.

16. The non-transitory computer-readable storage medium of claim 13, wherein the instructions further cause the memory controller to:

in accordance with a determination that the set of insert operations in the batched set of leaf node operations does not require a split of the copy of the first leaf node, process the set of insert operations in the batched set of leaf node operations by inserting one or more data objects corresponding to the set of insert operations into the copy of the first leaf node, the set of insert operations including one or more insert operations.

17. The non-transitory computer-readable storage medium of claim 13, wherein the instructions further cause the memory controller to:

in accordance with a determination that the set of insert operations in the batched set of leaf node operations requires a split of the copy of the first leaf node into two leaf nodes:

split the copy of the first leaf node into the two leaf nodes; and process the set of insert operations in the batched set of leaf node operations, the set of insert operations including one or more insert operations, the processing including:

inserting data objects associated with the set of insert operations into a particular leaf node of the two leaf nodes; and in accordance with a determination that the particular leaf node is full, inserting data objects associated with remaining insert operations in the set of insert operations into a second leaf node of the two leaf nodes.

18. The non-transitory computer-readable storage medium of claim 13, wherein the instructions further cause the memory controller to:

in accordance with a determination that the set of insert operations in the batched set of leaf node operations requires a split of the copy of the first leaf node into three or more leaf nodes:

split the copy of the first leaf node into the three or more leaf nodes; and process the set of insert operations in the batched set of leaf node operations, the set of insert operations including two or more insert operations, the processing including:

inserting data objects associated with a first subset of the set of insert operations into a first leaf node of the three or more leaf nodes;

in accordance with a first determination that the first leaf node of the three or more leaf nodes is full, inserting data objects associated with a second subset of insert operations of the set of insert operations, distinct from the first subset of insert operations, into a second leaf node of the three or more leaf nodes; and in accordance with a second determination that the second leaf node is full, inserting data objects associated with remaining insert operations in the set of insert operations, distinct from the insert operations in the first subset of insert operations and the second subset of insert operations, into remaining leaf nodes of the three or more leaf nodes that are distinct from the first leaf node and the second leaf node.

* * * * *